(12) United States Patent
Buchanan et al.

(10) Patent No.: US 8,126,809 B2
(45) Date of Patent: *Feb. 28, 2012

(54) METHOD AND SYSTEM FOR PROCESSING FINANCIAL INSTRUMENT DEPOSITS PHYSICALLY REMOTE FROM A FINANCIAL INSTITUTION

(75) Inventors: Danne L. Buchanan, Sandy, UT (US); William Ronald Titus, Fruit Heights, UT (US)

(73) Assignee: PPS Data, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/624,076

(22) Filed: Nov. 23, 2009

(65) Prior Publication Data

US 2010/0070415 A1   Mar. 18, 2010

Related U.S. Application Data

(60) Continuation of application No. 12/210,593, filed on Sep. 15, 2008, now Pat. No. 7,624,071, which is a division of application No. 10/914,151, filed on Aug. 10, 2004, now Pat. No. 7,440,924, which is a division of application No. 09/560,779, filed on Apr. 28, 2000, now Pat. No. 7,181,430.

(51) Int. Cl.
*G06Q 40/00* (2012.01)

(52) U.S. Cl. ............... 705/45; 705/35; 705/40; 705/41; 705/42; 705/43; 705/44; 705/16; 705/17; 705/18; 235/379; 235/380; 235/381

(58) Field of Classification Search ............ 705/35, 705/40–45, 16–18; 235/379–381
See application file for complete search history.

(56) References Cited

U.S. PATENT DOCUMENTS 4,027,142 A   5/1977   Paup et al.
(Continued)

FOREIGN PATENT DOCUMENTS

CA   2131667   9/1994
(Continued)

OTHER PUBLICATIONS

*Netdeposit LLC v. Bserv. Inc.*, et al.; Complaint for Patent Infringement filed Nov. 6, 2009; Case 1:09-cv-00842-UNA; pp. 1-25.

(Continued)

*Primary Examiner* — Narayanswamy Subramanian
(74) *Attorney, Agent, or Firm* — Foley & Lardner LLP

(57) ABSTRACT

A system that includes computer hardware, computer software, apparatus, and methodology that enables individuals, businesses, and all types of organizations (both for profit and non-profit) to capture and securely transmit check images (including, but not limited to, personal checks, business checks, travelers checks, money orders, merchant coupons, food coupons, line of credit checks, etc.), deposit information, and other information from remote locations (i.e., locations that could include the financial institution's remote locations, other financial institution's locations, businesses, private residences, etc.), for the purpose of having those checks credited to the depositing individual's or organization's bank account(s) and having the check images (and/or physical checks) entered into the bank check clearing channels for ultimate delivery to the maker bank for payment out of the maker's account.

9 Claims, 15 Drawing Sheets

U.S. PATENT DOCUMENTS

| | | | |
|---|---|---|---|
| 4,126,779 A | 11/1978 | Jowers et al. | |
| 4,201,978 A | 5/1980 | Nally | |
| 4,264,808 A | 4/1981 | Owens et al. | |
| 4,321,672 A | 3/1982 | Braun et al. | |
| 4,326,258 A | 4/1982 | De la Guardia | |
| 4,358,671 A * | 11/1982 | Case | 235/379 |
| 4,417,136 A | 11/1983 | Rushby et al. | |
| 4,454,575 A | 6/1984 | Bushaw et al. | |
| 4,457,015 A | 6/1984 | Nally et al. | |
| RE31,692 E | 10/1984 | Tyburski et al. | |
| 4,500,750 A | 2/1985 | Elander et al. | |
| 4,523,330 A | 6/1985 | Cain | |
| 4,555,617 A | 11/1985 | Brooks et al. | |
| 4,578,530 A | 3/1986 | Zeidler | |
| 4,602,936 A | 7/1986 | Töpfl et al. | |
| 4,650,978 A | 3/1987 | Hudson et al. | |
| 4,680,803 A | 7/1987 | DiLella | |
| 4,694,147 A | 9/1987 | Amemiya et al. | |
| 4,730,767 A | 3/1988 | Gendron | |
| 4,731,524 A | 3/1988 | Brooks | |
| 4,750,201 A | 6/1988 | Hodgson et al. | |
| 4,843,220 A | 6/1989 | Haun | |
| 4,858,121 A | 8/1989 | Barber et al. | |
| 4,888,812 A | 12/1989 | Dinan et al. | |
| 4,912,762 A | 3/1990 | Lee et al. | |
| 4,926,325 A | 5/1990 | Benton et al. | |
| 4,948,174 A | 8/1990 | Thomson et al. | |
| 4,960,981 A | 10/1990 | Benton et al. | |
| 4,974,878 A | 12/1990 | Josephson | |
| 5,053,607 A | 10/1991 | Carlson et al. | |
| 5,054,096 A | 10/1991 | Beizer | |
| 5,091,968 A | 2/1992 | Higgins et al. | |
| 5,121,945 A | 6/1992 | Thomson et al. | |
| 5,122,950 A | 6/1992 | Benton et al. | |
| 5,144,115 A | 9/1992 | Yoshida | |
| 5,159,548 A | 10/1992 | Caslavka | |
| 5,168,444 A | 12/1992 | Cukor et al. | |
| 5,175,682 A * | 12/1992 | Higashiyama et al. | 705/45 |
| 5,200,993 A | 4/1993 | Wheeler et al. | |
| 5,229,764 A | 7/1993 | Matchett et al. | |
| 5,237,158 A | 8/1993 | Kern et al. | |
| 5,237,159 A | 8/1993 | Stephens et al. | |
| 5,265,007 A * | 11/1993 | Barnhard et al. | 705/45 |
| 5,274,567 A | 12/1993 | Kallin et al. | |
| 5,321,816 A | 6/1994 | Rogan | |
| 5,324,922 A | 6/1994 | Roberts | |
| 5,326,959 A | 7/1994 | Perazza | |
| 5,373,550 A | 12/1994 | Campbell et al. | |
| 5,384,835 A | 1/1995 | Wheeler et al. | |
| 5,412,190 A | 5/1995 | Josephson et al. | |
| 5,425,080 A | 6/1995 | Abbie | |
| 5,438,184 A | 8/1995 | Roberts et al. | |
| 5,444,779 A | 8/1995 | Daniele | |
| 5,444,794 A | 8/1995 | Uhland | |
| 5,453,601 A | 9/1995 | Rosen | |
| 5,473,143 A | 12/1995 | Vak et al. | |
| 5,484,988 A | 1/1996 | Hills et al. | |
| 5,488,671 A | 1/1996 | Kern | |
| 5,504,822 A | 4/1996 | Holt | |
| 5,506,691 A | 4/1996 | Bednar et al. | |
| 5,528,705 A | 6/1996 | Reasoner, Jr. et al. | |
| 5,528,765 A | 6/1996 | Milligan | |
| 5,532,464 A | 7/1996 | Josephson et al. | |
| 5,544,255 A | 8/1996 | Smithies et al. | |
| 5,546,471 A | 8/1996 | Merjanian | |
| 5,583,759 A | 12/1996 | Geer | |
| 5,613,012 A | 3/1997 | Hoffman et al. | |
| 5,615,277 A | 3/1997 | Hoffman | |
| 5,619,524 A | 4/1997 | Ling et al. | |
| 5,664,111 A | 9/1997 | Nahan et al. | |
| 5,668,897 A | 9/1997 | Stolfo | |
| 5,673,333 A | 9/1997 | Johnston | |
| 5,677,955 A | 10/1997 | Doggett et al. | |
| 5,678,046 A | 10/1997 | Cahill et al. | |
| 5,679,938 A | 10/1997 | Templeton et al. | |
| 5,684,965 A | 11/1997 | Pickering | |
| 5,689,579 A | 11/1997 | Josephson | |
| 5,691,524 A | 11/1997 | Josephson | |
| 5,708,810 A | 1/1998 | Kern et al. | |
| 5,717,868 A | 2/1998 | James | |
| 5,760,916 A | 6/1998 | Dellert et al. | |
| 5,783,808 A | 7/1998 | Josephson | |
| 5,784,610 A | 7/1998 | Copeland, III et al. | |
| 5,787,403 A | 7/1998 | Randle | |
| 5,787,405 A | 7/1998 | Gregory | |
| 5,793,302 A | 8/1998 | Stambler | |
| 5,802,498 A | 9/1998 | Comesanas | |
| 5,819,236 A | 10/1998 | Josephson | |
| 5,832,463 A | 11/1998 | Funk | |
| 5,832,464 A | 11/1998 | Houvener et al. | |
| 5,864,871 A | 1/1999 | Kitain et al. | |
| 5,870,725 A | 2/1999 | Bellinger et al. | |
| 5,889,863 A | 3/1999 | Weber | |
| 5,890,141 A | 3/1999 | Carney et al. | |
| 5,893,078 A | 4/1999 | Paulson | |
| 5,895,453 A | 4/1999 | Cook | |
| 5,895,455 A | 4/1999 | Bellinger et al. | |
| 5,897,625 A | 4/1999 | Gustin et al. | |
| 5,904,844 A | 5/1999 | Stone | |
| 5,910,988 A | 6/1999 | Ballard | |
| 5,917,965 A | 6/1999 | Cahill et al. | |
| 5,930,778 A | 7/1999 | Geer | |
| 5,936,541 A | 8/1999 | Stambler | |
| 5,940,813 A | 8/1999 | Hutchings | |
| 5,940,844 A | 8/1999 | Cahill et al. | |
| 5,953,702 A | 9/1999 | Ohlemacher et al. | |
| 5,963,647 A | 10/1999 | Downing et al. | |
| 5,963,659 A | 10/1999 | Cahill et al. | |
| 5,974,148 A | 10/1999 | Stambler | |
| 5,978,840 A | 11/1999 | Nguyen et al. | |
| 5,999,624 A | 12/1999 | Hopkins | |
| 6,019,282 A * | 2/2000 | Thompson et al. | 235/379 |
| 6,021,202 A | 2/2000 | Anderson et al. | |
| 6,029,172 A | 2/2000 | Jorna et al. | |
| 6,032,137 A | 2/2000 | Ballard | |
| 6,036,344 A | 3/2000 | Goldenberg | |
| 6,038,553 A | 3/2000 | Hyde, Jr. | |
| 6,045,039 A | 4/2000 | Stinson et al. | |
| 6,105,011 A | 8/2000 | Morrison, Jr. | |
| 6,108,104 A | 8/2000 | Tesavis | |
| 6,112,902 A | 9/2000 | Hayduchok et al. | |
| 6,115,509 A | 9/2000 | Yeskel | |
| 6,138,107 A | 10/2000 | Elgamal | |
| 6,164,528 A | 12/2000 | Hills et al. | |
| 6,178,409 B1 | 1/2001 | Weber et al. | |
| 6,181,837 B1 | 1/2001 | Cahill | |
| 6,189,785 B1 | 2/2001 | Lowery | |
| 6,202,055 B1 | 3/2001 | Houvener et al. | |
| 6,230,148 B1 * | 5/2001 | Pare et al. | 705/40 |
| 6,257,783 B1 | 7/2001 | Hanaoka et al. | |
| 6,289,322 B1 | 9/2001 | Kitchen et al. | |
| 6,301,379 B1 | 10/2001 | Thompson et al. | |
| 6,363,164 B1 | 3/2002 | Jones et al. | |
| 7,181,430 B1 * | 2/2007 | Buchanan et al. | 705/45 |
| 7,216,106 B1 | 5/2007 | Buchanan et al. | |
| 7,386,511 B2 | 6/2008 | Buchanan et al. | |
| 7,440,924 B2 | 10/2008 | Buchanan et al. | |
| 7,620,603 B2 * | 11/2009 | Gilder et al. | 705/44 |
| 7,624,071 B2 | 11/2009 | Buchanan et al. | |
| 7,702,588 B2 * | 4/2010 | Gilder et al. | 705/44 |
| 7,792,753 B1 * | 9/2010 | Slater et al. | 705/45 |
| 2002/0001393 A1 | 1/2002 | Jones et al. | |
| 2002/0152170 A1 | 10/2002 | Dutta et al. | |
| 2003/0009420 A1 | 1/2003 | Jones | |
| 2003/0023557 A1 | 1/2003 | Moore | |
| 2003/0033252 A1 | 2/2003 | Buttridge et al. | |
| 2003/0050889 A1 | 3/2003 | Burke | |
| 2007/0288382 A1 | 12/2007 | Narayanan et al. | |
| 2008/0046361 A2 | 2/2008 | Bent et al. | |
| 2008/0061126 A1 | 3/2008 | Meidell et al. | |
| 2008/0065524 A1 | 3/2008 | Matthews et al. | |
| 2008/0071679 A1 | 3/2008 | Foley | |
| 2008/0097907 A1 | 4/2008 | Till et al. | |
| 2008/0123932 A1 | 5/2008 | Jones et al. | |
| 2008/0262953 A1 | 10/2008 | Anderson et al. | |

| | | | |
|---|---|---|---|
| 2009/0008442 | A1* | 1/2009 | Buchanan et al. ............ 235/379 |
| 2009/0094148 | A1 | 4/2009 | Gilder et al. |
| 2010/0070415 | A1* | 3/2010 | Buchanan et al. ............ 705/45 |

FOREIGN PATENT DOCUMENTS

| | | |
|---|---|---|
| CA | 2131667 | 6/1995 |
| EP | 0 320 713 | 6/1989 |
| EP | 0 320 756 | 6/1989 |
| EP | 0 593 209 | 4/1994 |
| EP | 0 661 654 | 7/1995 |
| EP | 0 671 696 | 9/1995 |
| EP | 0 678 829 | 10/1995 |
| FR | 2 624 632 | 6/1989 |
| GB | 2 297 414 | 7/1996 |
| WO | WO-91/06052 | 5/1991 |
| WO | WO-91/06058 | 5/1991 |
| WO | WO-97/07468 | 2/1997 |
| WO | WO-97/22060 | 6/1997 |
| WO | WO-97/36254 | 10/1997 |
| WO | WO-98/47100 | 10/1998 |

OTHER PUBLICATIONS

*PPS Data, LLC* v. *Diebold, Inc.*; Amended Complaint for Patent Infringement filed Aug. 15, 2011; Case 1:09-cv-00842-LPS; pp. 1-18.
"Add Value by Reinventing Accounts Receivable Processing," *Corporate Cashflow*, vol. 15, No. 2, Feb. 1994, pp. 2, 17-18, and 27.
"At Your Service", *A Newsletter from the Federal Reserve Bank of Kansas City, Special Ed.*, Summer 1995. Kansas City.
"Document Management—Imaging System Achieves Payback in One Year," *Managing Office Technology*, Aug. 1997, p. 31.
"Electronic check presentment on the move," *ABA Banking Journal*, Aug. 1995, pp. 53-56.
"IBM 3898 Image Processor", *US Marketing & Services,* Mar. 13, 1990.
"Image Archive Yields Faster Retrieval," *News Briefs*, Bank Systems Technology, May 1996, p. 16.
"Image processing could cut clearing costs," *Banking World*, Apr. 1993, vol. 11, No. 3, pp. 40-41.
"Image system communications," *IBM Systems Journal*, 1990, pp. 370-383.
"Image technology brings lockbox breakthroughs," *Corporate Cashflow*, vol. 16, No. 9, Sep. 1995, pp. 16-18 and 20.
"Operational image systems: A new opportunity," IBM Systems Journal, 1990, pp. 304-313.
"Preliminary Invalidity Contentions of Defendants", *United States District Court for the Eastern District of Texas Texarkana Division, Civil Action No. 5:02cv124*, Dec. 3, 2002, pp. 1-20.
"Program Product", *Electronic Payment Systems Support/check Processing Control System: Program Reference and Operational Manual, 8th ed.*, Jun. 1986, International Business Machines Corporation.
"Six Hardware Devices in One," *Wall Street & Technology*, Mar. 1993, "Product Watch".
"Unisys check imaging delivers the competitive magic of tomorrow. Today.," 1992, Unisys Corporation.
250 U.S. banks to use NCR, Cincinnati Bell financial systems, AT&T News Release [On-line], May 4, 1993 [Retrieved Nov. 15, 2002]. Retrieved from the Internet: <URL:http://www.att.com/news/0593/930504.ncd.html.
A. Cortese, Image yields interest at banks, DialogNews Document [On-line], Mar. 19, 1990 [Retrieved Nov. 25, 2002], p. 6, Computerworld. Retrieved from the Internet: <URL:http://www.dialogselect.com/news/cgi.
*ABA Banking Journal*, vol. LXXXVII, Issue No. 8, Aug. 1995, p. 2. Allfirst Financial to Use VECTOR:Capture for Prime Pass to Enable Image Archive-Sterling Commerce helps Allfirst Financial protect existing hardware investment while implementing image strategy, DialogNews Document [On-line], Dec. 8, 2000, 10:31 EST [Retrieved Feb. 10, 2003], Business Wire. Retrieved from the Internet: <URL:http://www.dialogselect.com/news/cgi.
Amato-McCoy, Deena, "State Dept. Credit Union Improves Check Retrieval," *Bank Systems Technology*, Apr. 1997, p. 28.

American Bankers Association, *American National Standard for Financial Image Interchange: Architecture, Overview and System Design Specification*, 1994, American National Standards Institute, Inc.
American National Standard for Financial Image Interchange: Architecture, Overview and System Design Specification (ANSI/ABA X9.xx-1994 Draft version 0.7), American National Standards Institute, Inc., Approved 1994, p. 1-202.
Archive Storage and Retrieval Component Decomposition, FSTC Check Image Interchange Project, May 25, 1995, p. 1-20 with attachments.
Arend, Mark, "Check imaging: Banks are getting the picture," *ABA Banking Journal*, May 1992, pp. 44, 47, 49, 51, 53.
Arnette, Denise A., "Cash management: Banks turn imaging into speedy new delivery products," *Corporate Cashflow*, vol. 15, No. 1, Jan. 1994, pp. 1 and 12-13.
Articles, IBM Systems Journal, vol. 29, Issue 3, pp. 1-2, 1990.
As Banks Cling to the Conventional, Check-Imaging Struts Its Stuff, DialogNews Document [On-line], Mar. 1994 [Retrieved Nov. 20, 2002], p. 1, Bank Technology News. Retrieved from the Internet: <URL:http://www.dialogselect.com/news/cgi.
AT&T Global offers one-step imaging, DialogNews Document [On-line], Feb. 28, 1994 [Retrieved Nov. 15, 2002], vol. 159, No. 39, p. 14A(1), American Banker. Retrieved from the Internet: <URL:http://www.dialogselect.com/news/cgi.
AT&T SIIPS Proof-of-Deposit Operations Guide, AT&T Confidential, D1-4619-A, Issue 1, Mar. 1995.
B. DePompa, IBM adds image-based check processing, DialogNews Document [On-line], Mar. 19, 1990 [Retrieved Nov. 25, 2002], vol. 11, No. 12, p. 12(1), MIS Week. Retrieved from the Internet: <URL:http://www.dialogselect.com/news/cgi.
B. Tracey, IBM unveils first stage of image-check system, DialogNews Document [On-line], Apr. 1990 [Retrieved Nov. 25, 2002], vol. 7, No. 4, p. 12(3), Computers in Banking. Retrieved from the Internet: <URL:http://www.dialogselect.com/news/cgi.
Banctec announces new image archiving product and initial sale to major U.S. bank, Business Wire, Nov. 10, 1994, Business Wire, Inc. BancTec Inc. has received another order for its image statement processing product, DialogNews Document [On-line], Nov. 13, 1991 [Retrieved Nov. 15, 2002], vol. 8, No. 22, p. 5(2), Financial Services Report. Retrieved from the Internet: <URL:http://www.dialogselect.com/news/cgi.
Banctec to Take Over Recognition International, Item Processing Report, May 25, 1995, p. 1-10, vol. 6, No. 10, Phillips Business Information, Inc., Washington, DC, USA.
Banctec/Recognition Merger No Longer a Sure Thing, Item Processing Report, Aug. 31, 1995, p. 1-10, vol. 6, No. 17, Phillips Business Information, Inc., Washington, DC, USA.
Bank Manages Remote Sites With Check-Imaging System, Factiva [On-line], Sep. 12, 1996 [Retrieved Jun. 25, 2003], vol. 7, Issue: 18, Phillips Business Information, Inc. Retrieved from the Internet: <URL:http://global.factiva.com/en/arch/print_results.asp.
Banking's Role in Tomorrow's Payments System, Payments System Overview, A Study Prepared for the Banking Research Fund on Behalf of the Payments Systems Committee of the Bankers Roundtable, Furash & Company, Chapter I, vol. II, Jun. 1994.
Banks Eliminate Teller Traffic With 'Smart' ATMs, Factiva [On-line], Feb. 3, 1994 [Retrieved Jun. 20, 2003], vol. 5, No. 2, ISSN: 1048-5120, Phillips Business Information, Inc. Retrieved from the Internet: <URL:http://global.factiva.com/en/arch/print_results.asp.
Banks Increase Fees With Image-Cash Management, Factiva [On-line], Nov. 9, 1995 [Retrieved Jun. 25, 2003], vol. 6, Issues: 22, Phillips Business Information, Inc. Retrieved from the Internet: <URL:http://global.factiva.com/en/arch/print_results.asp.
Banks to Check Out Imaging (Solutions), DialogNews Document [On-line], Oct. 19, 1992 [Retrieved Oct. 24, 2002], No. 093, p. 46, Communicationsweek International. Retrieved from the Internet: <URL:http://www.dialogselect.com/news/cgi.
Banks to Test Imaging for Clearing Checks, DialogNews Document [On-line], Sep. 14, 1992 [Retrieved Nov. 20, 2002], p. 35, CommunicationsWeek. Retrieved from the Internet: <URL:http://www.dialogselect.com/news/cgi.

Bantec, Factiva [On-line], Oct. 29, 1992 [Retrieved Jun. 20, 2003], vol. 3, No. 21, ISSN: 1048-5120, Phillips Business Information, Inc. Retrieved from the Internet: <URL:http://global.factiva.com/en/arch/print_results.asp.

Barclays Revs Up IBM Check Imaging System, Technology/Operations, American Banker, pp. 14, Mar. 29, 1994.

Barnett Moving to Image-Based Check Sorting, Technology/Operations, American Banker, pp. 31, Mar. 25, 1994.

Behnke et al., NSSDC's Mass Storage System Evolves [On-line], Mar. 1995 [Retrieved Dec. 2, 2002], vol. 11, No. 1. Retrieved from the Internet: <URL:http://nssdc.gsfc.nasa.gov/nssdc_news/march95/09_j_behnke_0395.html.

Benmohamed, Lotfi, et al., "Architecture and Performance Analysis of a Large Scale Archival and Retrieval System," *Proceedings SPIE—The International Society for Optical Engineering*, vol. 2606, Oct. 25-26, 1995, Philadelphia, Pennsylvania, pp. 36-47.

Bensen, Paul, "Digital imaging solves county's records boom,"Jun. 1996 *INFORM*, pp. 3 and 28-30.

Bernard, Document Image Processing, 1991: The Imaging Edge (The Association for Information and Image Management's 1991 Conference and Exposition held in Washington, D.C., on Apr. 29-May 2), Seybold Report on Publishing Systems, vol. 20, No. 19, p. 22(8), Jun. 24, 1991.

Beware of Check Image Archival Scheme, Factiva [On-line], Oct. 10, 1996 [Retrieved ???], vol. 7, Issue: 20, Phillips Business Information, Inc. Retrieved from the Internet: <URL:http://_.

Bill Processing: U S West Re-engineers with $7.2 Million Unisys Image-based Remittance Processing Solution, DialogNews Document [On-line], Oct. 23, 1995 [Retrieved Nov. 20, 2002], vol. 10, No. 378, p. N/A, EDGE, on & about AT&T. Retrieved from the Internet: <URL:http://www.dialogselect.com/news/cgi.

Branch data delivered on CD, DialogNews Document [On-line], Dec. 1990 [Retrieved Feb. 10, 2003], vol. 82, No. 12, p. 60(1), ABA Banking Journal. Retrieved from the Internet: <URL:http://www.dialogselect.com/news/cgi.

Brisco, DNS Support for Load Balancing, Apr. 1995, p. 1-7, Trade & Industry; Magazine.

Broadway & Seymour Announces Client/Server Product for Item and Image Processing, DialogNews Document [On-line], Mar. 20, 1995 [Retrieved Nov. 20, 2002], p. 03201186, Business Wire. Retrieved from the Internet: <URL:http://www.dialogselect.com/news/cgi.

Broadway & Seymour announces new VISUALIMPACT release, DialogNews Document [On-line], Mar. 29, 1996 [Retrieved Nov. 20, 2002], p. 3291274, Business Wire. Retrieved from the Internet: <URL:http://www.dialogselect.com/news/cgi.

Broadway & Seymour to Invest in Two Strategic Initiatives, DialogNews Document [On-line], Mar. 15, 1995 [Retrieved Nov. 20, 2002], p. 03151248, Business Wire. Retrieved from the Internet: <URL:http://www.dialogselect.com/news/cgi.

Brouillette, BofA Is Doubtful on No-Check Plan, The American Banker, Apr. 10, 1979, Section: p. 2, American Banker, Inc.

Brubaker, et al., Electronic Check Presentment Is Ready for the Challenge of Same-Day Settlement, American Banker, The Daily Financial Services Newspaper, vol. CLVIII, No. 228, Dec. 1993.

Bussert, The Paper Predicament, A Hunter Publication, vol. 18, No. 7, pp. 72, 74, Jul. 1990.

Carreker, Strides in Electronic Checking Transforming Payment System (Includes Related Articles) (Cover Story), Bank Administration Institute, vol. 68, No. 3, pp. 1-14, Mar. 1, 1992.

Chase's New Image, DialogNews Document [On-line], Mar. 6, 1995 [Retrieved Nov. 15, 2002], No. 517, p. 14, Information Week. Retrieved from the Internet: <URL:http://www.dialogselect.com/news/cgi.

Check Image Exchange Project, FSTC: Projects [On-line] [Retrieved Oct. 30, 2002] Retrieved from the Internet: <URL:http://www.fstc.org/projects/imaging/participants.cfm.

Check Image System Opens Doors for Developer, Service Company, Factiva [On-line], Jun. 10, 1993 [Retrieved Jun. 20, 2003], vol. 4, No. 11, ISSN: 1048-5120, Phillips Business Information, Inc. Retrieved from the Internet: <URL:http://global.factiva.com/en/arch/print_results.asp.

Check Processing Conference, Reference Guide, Mar. 22-25, 1994, Bank Administration Institute, New Orleans, Louisiana, USA.

Check Recapture Processing Software Gets U.S. Patent, Factiva [On-line], Apr. 10, 1997 [Retrieved Jun. 26, 2003], vol. 8, Issue: 7, Phillips Business Information, Inc. Retrieved from the Internet: <URL:http://global.factiva.com/en/arch/print_results.asp.

Check-Image Interchange Inches Closer, DialogNews Document [On-line], Jan. 1997 [Retrieved Oct. 24, 2002], vol. 10, No. 1, p. 19, Bank Technology News. Retrieved from the Internet: <URL:http://www.dialogselect.com/news/cgi.

Checks & Checking: Check Imaging At the Teller Station, DialogNews Document [On-line], Oct. 1996 [Retrieved Nov. 21, 2002], vol. 9, No. 10, p. 37, Bank Technology News. Retrieved from the Internet: <URL:http://www.dialogselect.com/news/cgi.

Chemical Chooses IBM Check Imaging, DialogNews Document [On-line], Sep. 1995 [Retrieved Nov. 20, 2002], vol. 8, No. 9, p. 11, Bank Technology News. Retrieved from the Internet: <URL:http://www.dialogselect.com/news/cgi.

Cincinnati Bell Information Systems (Integrators Briefs), DialogNews Document [On-line], Jul. 12, 1993 [Retrieved Nov. 15, 2002], No. 534, p. 129, Computer Reseller News. Retrieved from the Internet: <URL:http://www.dialogselect.com/news/cgi.

Cincinnati Bell: CBIS & Unisys in Major Imaging Agreement, DialogNews Document [On-line], Oct. 29, 1990 [Retrieved Nov. 20, 2002], vol. 5, No. 118, p. N/A, EDGE, on & about AT&T. Retrieved from the Internet: <URL:http://www.dialogselect.com/news/cgi.

Cisco partners with AT&T CMS on network switch manufacturing, Lucent Technologies [On-line], Sep. 26, 1995 [Retrieved Dec. 2, 2002]. Retrieved from the Internet: <URL:http://www.lucent.com/press/0995/950926.mma.html.

Computerm Announces Remote Check Imaging Support for VMC 8200 High-Speed Channel Extension System, DialogNews Document [On-line], Apr. 8, 1996 [Retrieved Nov. 25, 2002], p. 408LAM012, PR Newswire. Retrieved from the Internet: <URL:http://www.dialogselect.com/news/cgi.

Computerm eases remote imaging, DialogNews Document [On-line], Aug. 16, 1993 [Retrieved Nov. 25, 2002], vol. 158, No. 156, p. 13A(1), American Banker. Retrieved from the Internet: <URL:http://www.dialogselect.com/news/cgi.

Computerm Enables Boatmen's Bancshares to Execute Remote Check Imaging, DialogNews Document [On-line], Apr. 8, 1996 [Retrieved Nov. 25, 2002], p. 408LAM013, PR Newswire. Retrieved from the Internet: <URL:http://www.dialogselect.com/news/cgi.

Cooney, Frame Relay Comes to Computerm Extenders, Network World, pp. 14, Jun. 28, 1993.

Coyle, et al., Beyond the Hype—Character Recognition and Check Image Processing, You're not Ready to Make a Business Judgment About Image Check Processing, Unless you Understand the Trade-Offs in Acceptance and Substitution rates, Bank Management, vol. LXVII, No. 5, pp. 30-36, May 1991.

Crockett, Imaging System: Fed Seeks Proposals for Check Image System, The American Banker, Apr. 6, 1994, Section: Technology Report, p. 1, American Banker, Inc.

Crowe et al., Concurrent Case Studies IV Check Image Business Solutions (Presentation), Oct. 20, 1995.

Davies et al., Security for Computer Networks, An Introduction to Data Security in Teleprocessing and Electronic Funds Transfer, 1989, Second Edition, John Wiley & Sons.

Desmond, DataTrade lets traders gather data across nets, Network World, vol. 7, No. 12, Mar. 19, 1990.

Development of an Image-Enhanced Truncation Check Processing System—Request for Proposals-, Federal Reserve Bank of Boston, Feb. 1992.

DFA compacts big features, DialogNews Document [On-line], Dec. 1991 [Retrieved Feb. 10, 2003], vol. 39, No. 12, p. 40(1), Appliance Manufacturer. Retrieved from the Internet: <URL:http://www.dialogselect.com/news/cgi.

DFA compacts big features, DialogNews Document [On-line], May 1992 [Retrieved Feb. 10, 2003], vol. 40, No. 5, p. 20(1), Appliance Manufacturer. Retrieved from the Internet: <URL:http://www.dialogselect.com/news/cgi.

Dinan, R.F. et al., "ImagePlus High Performance Transaction System," *IBM Systems Journal*, vol. 29, No. 3, 1990, pp. 421-434.

DNS Support for Load Balancing, Rutgers University, pp. 1-7, Apr. 1995.

DSI Scores Record Check Image Deal, Factiva [On-line], Dec. 5, 1996 [Retrieved Jun. 26, 2003], vol. 7, Issue: 24, Phillips Business Information, Inc. Retrieved from the Internet: <URL:http://global.factiva.com/en/arch/print_results.asp.

EDS Becomes IBM's First Remote Image Distribution Customer, Factiva [On-line], Mar. 30, 1995 [Retrieved Jun. 24, 2003], vol. 6, Issue: 6. Retrieved from the Internet: <URL:http://global.factiva.com/en/arch/print_results.asp.

Error Messages, NCR 7731 Personal Image Processor (D1-2453-C), 1992, NCR Corporation, USA.

Federal Reserve Spurring Image Technology Use Through Its Own Initiatives, Factiva [On-line], Mar. 19, 1992 [Retrieved Jun. 20, 2003], vol. 3, No. 6, ISSN: 1048-5120, Phillips Publishing, Inc. Retrieved from the Internet: <URL:http://global.factiva.com/en/arch/print_results.asp.

Ferring, Image Processing Seen as Hottest Banking Tool by 1994, The American Banker, Feb. 26, 1990, Section: Technology News, p. 3, American Banker, Inc.

Ferris, Fed Backs Off Plan to Increase Clearing Fees for Remote Banks, The American Banker, Apr. 1, 1985, Section: p. 1, American Banker, Inc.

Few Banks Buying Check-Image Systems, Technology/Operations, American Banker, pp. 16-38, Apr. 5, 1994.

Financial Services Technology Consortium Interbank Check Imaging Project Meeting, Lawrence Livermore National Laboratory, Apr. 25-26, 1994, p. JPMC 000964-001010.

Financial Services Technology Consortium Interbank Check Imaging Project, Financial Services Technology Consortium, New York, NY, May 25, 1994.

Financial Services Technology Consortium Interbank Check Imaging Project, ABA Corporate Operations Committee, pp. 1-6, Apr. 28, 1995.

Financial Services Technology Consortium Interbank Check Imaging Project White Paper, Jun. 20, 1994, p. 1-30.

Financial Services Technology Consortium, FSTC Presentation to ANSI, Sep. 30-Oct. 1, 1996.

Financial Services Technology Consortium, Interbank Check Imaging Project (Presentation), May 25, 1994.

Financial Services Technology Consortium, PACES Paperless Automated Check Exchange & Settlement Project Proposal, Apr. 23, 1998, p. 1-25.

Fisher, IBM, Customers Continue Work on Document Image Processor, Datamation, vol. 34, No. 19, p23(2), pp. 1-3, Oct. 1, 1988.

Fitch, Thomas P., "Check image capture speeds up positive pay reconcilement," *Corporate Cash flow*, vol. 16, No. 2, Feb. 1995, pp. 1, 7 and 11.

Fleming, Trent, "The road to imaging for community banks," *ABA Banking Journal*, Dec. 1993, pp. 60, 62, 65.

Forms Processing Takes Imaging Beyond the Image Text Retrieval Important to Insurance, Banking, Factiva [On-line], Dec. 21, 1995 [Retrieved Jun. 25, 2003], vol. 6, Issue: 25, Phillips Business Information, Inc. Retrieved from the Internet: <URL:http://global.factiva.com/en/arch/print_results.asp.

Franca, V., "A Station for Capture, Processing and Storing of Documents," *IEEE*, 1991, *Proceedings*, vol. II, 6$^{th}$ Mediterranean Electrotechnical Conference, May 22-24, 1991, Ljubljana, Slovenia, Yugoslavia, pp. i-xxviii, and 1264-1267.

From Check Research to Fraud Control, Financial Professionals are turning to: Image-Based Cash Management, EC World, Retrieved from the Internet: ,URL:http://www.ecomworld.com, Apr. 1997.

Frost National Bank selects NCR over old mainframe environment, AT&T News Release [On-line], Apr. 28, 1993 [Retrieved Nov. 15, 2002]. Retrieved from the Internet: <URL:http://www.att.com/news/0493/930428.nca.html.

FSIC Check Image Exchange Project—Proposed Pilot Cash Letter Flow, Mar. 9, 1995, 5 Figures.

FSTC Demonstrates Interbank Check Image Pilot; Multi-Vendor Systems Speeds Check Clearing, Cuts Fraud; FSTC Pilot Lays Foundation for Paper Check Truncation, PR Newswire, Dec. 12, 1995, Section: Financial News, PR Newswire Association, Inc.

FSTC Projects, Check Image Exchange Project, FSTC: Projects [On-line] [Retrieved Oct. 30, 2002]. Retrieved from the Internet: <URL:http://www.fstc.org/projects/imaging/public/information.cfm.

Gellerman, California Bank Cashes in on Cash Imaging System, Imaging World, vol. 3, Issue 10, Oct. 18, 1994.

General Information, NCR 7731 Personal Image Processor (D1-2301-D), 1993, NCR Corporation.

Gopisetty, S., et al., "Automated forms—processing software and services," *IBM Journal of Research and Development*, vol. 40, No. 2, Mar. 1996, pp. 211-230.

Grigsby, Mason, "Document Management—Integrated Document Solutions: The Next Generation," *Managing Office Technology*, Dec. 1996, vol. 41, No. 12, pp. 28-29.

Grimes, IBM Study Finds a Potential Savings of 12% from Internal Check Nonreturn, The American Banker, May 21, 1980, Section: Bank Automation Annual; p. 14, American Banker, Inc.

Groenfeldt, Tom, "CheckScan gives images to customers," *Bank Systems—Technology*, Dec. 1995, pp. 20, 22.

Group Unveils Paperless Check-Clearing System, Item Processing Report, Dec. 21, 1995, p. 1-8, vol. 6, No. 25, Phillips Business Information, Inc., Washington, DC, USA.

Gullo, NCR Plans Imaging System to Run on Microprocessor, The American Banker, May 24, 1990, Section: Technology News, p. 3, American Banker, Inc.

Hellauer, Check processors deal with image at conference; Bank Administration Institute's 12th annual check processing conference, Computers in Banking, Jun. 1989, vol. 6, No. 6, p. 14, ISSN: 0742-6496, Information Access Company.

Helm, Banks Check Into Image Processing, Image will Revolutionize Check Processing Even More Than MICR did some 30 Years Ago. Some Bankers Are Eager to Jump in, Even Though It's an Expensive Technology and It's Expected to Do a Lot of Things That It Can't—Yet, Computers in Banking, vol. 7, No. 3, Mar. 1990.

Helm, Sylvia, "Who's doing what in image processing," *ABA Banking Journal*, Jan. 1991, vol. LXXXIII, No. 1, pp. 31-33.

Home Loan Bank to offer check-image statements to members' customers, DialogNews Document [Online], Dec. 29, 1994 [Retrieved Nov. 15, 2002], vol. 159, No. 248, p. 14(1), American Banker. Retrieved from the Internet: <URL:http://www.dialogselect.com/news/cgi.

Howe, et al., Government Plans for Data Security Spill Over to Civilian Networks, Data Communications, Mar. 1987.

Huntington Bancshares in the Forefront of Technology with Purchase of Unisys Check Imaging System, DialogNews Document [On-line], Oct. 11, 1989 [Retrieved Nov. 20, 2002], p. 1, PR Newswire. Retrieved from the Internet: <URL:http://www.dialogselect.com/news/cgi.

IA Corp. Uses StorageTek Robotic Library for First Client/Server Check Image Archive at Union Bank of California; New client/server CheckVision Archive Application Stores Millions of Checks Per Day Using StorageTek Technology for Quicker Image Retrieval and On-line Client Viewing, Business Wire, Oct. 7, 1996, Business Wire, Inc.

IBM 3898 Image Processor, Product Announcement, IBM, US Marketing & Services, Mar. 13, 1990.

IBM 3898 Image Processor, Product Announcement, Mar. 13, 1990, p. 1-3 w/summary, IBM.

IBM 3995 Optical Library Dataserver Products, IBM Corp., Customized Summary, pp. 1-5, Feb. 20, 1992.

IBM Announces Two Applications, Factiva [On-line], Oct. 12, 1995 [Retrieved Jun. 25, 2003], vol. 6, Issue: 20. Retrieved from the Internet: <URL:http://global.factiva.com/en/arch/print_results.asp.

IBM HPTS General Information Manual, Glossary, Numerics, Bibliography, and Index, 1990, pp. X1 to X15.

IBM ImagePlus High Performance Transaction System Overview, IBM, US Marketing & Services, pp. 1-7, Mar. 13, 1990.

IBM ImagePlus High Performance Transaction System, General Information Manual, 1990, pp. i-x, and 1-1 to 5-10 and A1 to A5.

IBM ImagePlus High Performance Transaction System, General Information Manual, 1990, pp. i-x, and 1-1 to 5-10 and A1 to A6 and X1-X15.

IBM Online Library: Installing and Using the Online Library, IBM Corp., GC31-8311-07, Eighth Edition, Sep. 1998.

IBM Sees Growth Ahead in Image Delivery, Archive, Item Processing Report, Oct. 26, 1995, p. 1-10, vol. 6, No. 21, Phillips Business Information, Inc., Washington, DC, USA.

Iida, Electronic Presentment Due for N.Y. Test, American Banker, vol. CLVII, No. 142, Jul. 27, 1992.

Image Archival System RFP, Federal Reserve Bank of Boston, Version 1.c, Revised Jun. 7, 1994.

Image Interchange Committee Continues to Hone Formal Draft of Standard, Factiva [On-line], Apr. 1, 1993 [Retrieved Jun. 20, 2003], vol. 4, No. 6, ISSN: 1048-5120, Phillips Business Information, Inc. Retrieved from the Internet: <URL:http://global.factiva.com/en/arch/print_results.asp.

Image Processing Package, Factiva [On-line], Aug. 3, 1995 [Retrieved Jun. 25, 2003], vol. 6, Issue: 15. Retrieved from the Internet: <URL:http://global.factiva.com/en/arch/print_results.asp.

Image Quality Functional Requirements, Jul. 26, 1995, p. 1-19.

Image systems gamer NOAC spotlight, DialogNews Document [On-line], Jul. 1989 [Retrieved Oct. 29, 2002], vol. 6, No. 7, p. 8(4), Computers in Banking. Retrieved from the Internet: <URL:http://www.dialogselect.com/news/cgi.

Image Technology in Banking Conference, Oct. 18-20, 1995, Nashville, Tennessee, #P15976.

Image Technology in Banking Conference, Reference Guide, Oct. 18-20, 1995, Bank Administration Institute, Nashville, TN, USA.

Image-Based Check Archival System, Factiva [On-line], Apr. 15, 1993 [Retrieved Jun. 20, 2003], vol. 4, No. 7, ISSN: 1048-5120, Phillips Business Information, Inc. Retrieved from the Internet: <URL:http://global.factiva.com/en/arch/print_results.asp.

ImagePlus High Performance Transaction System (HPTS), IBM Corp., 1990.

Images Shown as Checks Record, The American Banker, May 22, 1979, Section: p. 6, American Banker, Inc.

Imaging is Bridge to Virtual Banking, Factiva [On-line], Nov. 21, 1996 [Retrieved Jun. 26, 2003], vol. 7, Issue: 23, Phillips Business Information, Inc. Retrieved from the Internet: <URL:http://global.factiva.com/en/arch/print_results.asp.

Imaging products, DialogNews Document [On-line], Aug. 1990 [Retrieved Nov. 15, 2002], vol. 100, No. 8, p. 23(3), United States Banker. Retrieved from the Internet: <URL:http://www.dialogselect.com/news/cgi.

Imaging, DialogNews Document [On-line], Nov. 5, 1990 [Retrieved Feb. 10, 2003], p. 8, InformationWeek. Retrieved from the Internet: <URL:http://www.dialogselect.com/news/cgi.

Impact of Imaging, DialogNews Document [On-line], Nov. 1991 [Retrieved Nov. 20, 2002], vol. 67, No. 11, p. 56, Bank Management. Retrieved from the Internet: <URL:http://www.dialogselect.com/news/cgi.

Interested in Using Image Technology Within Five Years? You Better Start Now, Factiva [On-line], Dec. 26, 1991 [Retrieved Jun. 20, 2003], vol. 2, No. 25, ISSN: 1048-5120, Phillips Publishing, Inc. Retrieved from the Internet: <URL:http://global.factiva.com/en/arch/print_results.asp.

Item processing leaps ahead with VisualImpact and Windows NT, DialogNews Document [On-line], Jun. 1995 [Retrieved Nov. 20, 2002], vol. 105, No. 6, p. S4(3), US Banker. Retrieved from the Internet: <URL:http://www.dialogselect.com/news/cgi.

J&B Introduces Image System, Factiva [On-line], Aug. 3, 1995 [Retrieved Jun. 25, 2003], vol. 6, Issue: 15. Retrieved from the Internet: <URL:http://global.factiva.com/en/arch/print_results.asp.

J. McGinn, IBM ImagePlus High Perforamnce Transaction System, DialogNews Document [On-line], Mar. 21, 1990 [Retrieved Nov. 25, 2002], No. 1389, p. CG103210008, Computergram International. Retrieved from the Internet: <URL:http://www.dialogselect.com/news/cgi.

Jeanne Bahnke et al., "NSSDC's Mass Storage System Evolves", Mar. 1995, pp. 1 and 2, vol. 11, No. 1., Dec. 2, 2002, http://nssdc.gsfc.nasa.gov/nssdc_news/march95/09_i_behnke_0395.html.

Kniskern, Engineering a Visionary Solution, Datamation, vol. 36, No. 8, p. 90(2), pp. 1-3, Apr. 15, 1990.

Kutler, Burroughs, Midland Study Image Processing, The American Banker, Apr. 10, 1979, Section: p. 2, American Banker, Inc.

Kutler, TRW Sells Image Processing System to Norwegian Clearing House, The American Banker, Nov. 16, 1988, Section: Technology Today, p. 9, American Banker, Inc.

Kutler, TRW Sells Image Processing System to Norwegian Clearing House, American Banker, The Daily Financial Services Newspaper, vol. CLIII, No. 224, Nov. 16, 1988.

Lipowicz, Banks Seek Way to Vie With Fed, MSW—Draft, pp. 211-212, Aug. 6, 2003.

Lomb, Reiner, et al., "Storage Management Solutions for Distributed Computing Environments," *Hewlett-Packard Journal*, Oct. 1996, vol. 47, pp. 81-89.

Lucent Technologies, "Cisco partners with AT&T CMS on network switch manufacturing", Sep. 26, 1995, Dec. 2, 2002, http://www.lucent.com/ress/0995/950926.mma.html.

Lunt, Penny, "Image pioneer takes proofing to a higher level," *ABA Banking Journal*, Mar. 1995, vol. LXXXVII, No. 3, pp. 2, 60, 62, 64.

Lunt, Penny, "Microfilm begone—companies want check images," *ABA Banking Journal*, Aug. 1996, vol. LXXXVIII, No. 8, pp. 3, 57, 62.

Lunt, Penny, "Paper-shy brokerages," *ABA Banking Journal*, Oct. 1996, vol. LXXXVIII, No. 10, pp. 3, 73-75.

Lunt, Welcome to sfnb.com The paradigm just shifted, ABA Banking Journal, Dec. 1995, Section: Cover Story, p. 40, American Bankers Association.

M. Barthel, Unisys, Banctec offer PC-based imaging: high-tech check statements produced; community banks are market, DialogNews Document [On-line], Oct. 8, 1992 [Retrieved Nov. 20, 2002], vol. 157, No. 195, p. 3(1), American Banker. Retrieved from the Internet: <URL:http://www.dialogselect.com/news/cgi.

M. Garvey, Check Processing Goes Digital—Chase Manhattan Bank to store checks electronically, saving time and money, DialogNews Document [On-line], Sep. 15, 1997 [Retrieved Oct. 24, 2002], No. 648, p. 20, Informationweek. Retrieved from the Internet: <URL:http://www.dialogselect.com/news/cgi.

M. Garvey, Check Processing Goes Digital, InformationWeek Online News in Rev [On-line], [Retrieved Jul. 29, 2002], InformationWeek.com. Retrieved from the Internet: <URL:http://www.informationweek.com/648/48iuchk.htm.

Major Check Industry Changes No Longer a Pipe Dream, Financial Services Report Phillips Business Information, Inc., Factiva, vol. 9, No. 25 ISSN: 0894-7260, pp. 1-5, Dec. 23, 1992.

Major check industry changes no longer a pipe dream; innovations in check processing helps reduce check fraud and cut cost for banking services, Financial Services Report, Dec. 23, 1992, vol. 9, No. 25, p. 2, ISSN: 0894-7260, Information Access Company.

Marjanovic, Fed Buys Banctec Check-Image Storage System, The American Banker, Feb. 1, 1996, Section: Technology/Operations, p. 18, American Banker, Inc.

Marjanovic, Five More Big Regionals Join National Clearinghouse, American Banker, The Daily Financial Services Newspaper, vol. CLIX, No. 140, Jul. 22, 1994.

Marjanovic, Mich. National Streamlines Imaging With IBM System (check imaging), American Banker, vol. 160, No. 176, p14(1), pp. 1-2, Sep. 13, 1995.

Matthews, Markets Jolted by Fed Action, Fears of Frequent Rate Hikes, American Banker, The Daily Financial Services Newspaper, vol. CLIX No. 74, Apr. 19, 1994.

McDonald, Create a National Bank for Imaging Services, The American Banker, Sep. 9, 1991, Section: Comment, p. 4, American Banker, Inc.

Medeiros, Case Studies in Check Image Archive Applications at Large US Banks: Making the Business Case, The Tower Group, Jul. 1998, 016:05W, p. 1-10, The Tower Group, Newton, MA, USA.

Medeiros, Case Studies in Check Imaging Technology for Corporate Cash Management Applications, TowerGroup, Mar. 31, 1996, 007:016W, p. 1-14, TowerGroup, Wellesley, MA, USA.

Medeiros, Check Fraud Prevention Technologies, TowerGroup, Apr. 30, 1996, 008:004, p. 1-16, TowerGroup, Wellesley, MA, USA.

Medeiros, Check Image in Proof-of-Deposit: Update, TowerGroup, Mar. 31, 1996, 007:018, p. 1-11, TowerGroup, Wellesley, MA, USA.

Medeiros, Check Image Technology in Corporate Cash Management Applications, TowerGroup, Feb. 29, 1996, 007:008W, p. 1-8, Exhs. 1-11, TowerGroup, Wellesley, MA, USA.

Medeiros, Check Imaging in Proof-of-Deposit Operations, The Tower Group Research Note, Jul. 30, 1993, 001:006, p. 1-13, The Tower Group.
Medeiros, Check Imaging: The IBM Approach, The Tower Group Research Note, Aug. 10, 1993, 001:010, p. 1-9, The Tower Group.
Medeiros, Check Imaging: The Unisys Approach, The Tower Group Research Note, Aug. 10, 1993, 001:008, p. 1-10, The Tower Group 1993.
Medeiros, Check Processing: Image Technology and the Outsourcing Decision, TowerGroup, Jun. 30, 1995, 004:030, p. 1-7, TowerGroup, Wellesley, MA, USA.
Medeiros, David W., "Image Technology Applications in Check Processing," presented at the BAI Transaction Processing Conference, San Antonio, TX, Mar. 31, 1996, pp. 1-106.
Medeiros, David W., "Image Technology Applications in Check Processing," presented at the BAI Transaction Processing SuperConference, New Orleans, LA, Mar. 24, 1998.
Medeiros, David W., "Introduction to Check and Document Imaging," presented at the BAI Image Technology in Banking Conference, Orlando, FL, Oct. 27, 1996, pp. 1-100.
Medeiros, David W., "Introduction to Check and Document Imaging," presented at the BAI Image Technology in Banking Conference, Nashville, TN, Oct. 18, 1995, pp. 1-93.
Medeiros, David, "Case studies in check imaging technology for corporate cash management applications," *The Tower Group*, Category: Industry Case Study, check imaging, D100-100, edit history: Sep. 5, 1996.
Medeiros, David, "Small-scale check imaging systems," *The Tower Group*, Category: Industry Case Study, check imaging, image lockbox, D100-000, edit history: Sep. 5, 1996.
Medeiros, David, "Statement with check images: update," *The Tower Group*, Category: Industry Case Study, check imaging, D100-400, edit history: Sep. 5, 1996.
Medeiros, Electronic Check Presentment, TowerGroup, Nov. 30, 1994, 003:020, p. 1-18, TowerGroup, Wellesley, MA, USA.
Medeiros, IBM's High Performance Transaction System (HPTS): A Status Report at the Five-Year Point, TowerGroup, Mar. 31, 1995, 004:011, p. 1-12, TowerGroup, Wellesley, MA, USA.
Medeiros, Lockbox Check Processing: Wholesale, Retail, Imaging, and Workflow Technology, TowerGroup, Mar. 31, 1995, 004:012, p. 1-13, TowerGroup, Wellesley, MA, USA.
Medeiros, New Developments in Large-Scale Check Imaging Technology from IBM and Unisys, TowerGroup, Jan. 1997, 011:07, p. 1-13, TowerGroup, Newton, MA, USA.
Medeiros, Small-Scale Check Imaging Systems, TowerGroup, Feb. 28, 1995, 004:007, p. 1-14, TowerGroup, Wellesley, MA, USA.
Medeiros, Statements with Check Images, The Tower Group Research Note, Sep. 30, 1993, 001:013, p. 1-14, The Tower Group.
Medeiros, Statements with Check Images: Update, TowerGroup, Mar. 31, 1996, 007:017R, p. 1-10, TowerGroup, Wellesley, MA, USA.
Medeiros, Update: Check Imaging from IBM and Unisys, TowerGroup, Oct. 31, 1994, 003:019, p. 1-7, TowerGroup, Wellesley, MA, USA.
Medeiros, Workflow Software in Banking, TowerGroup Research Note, Jan. 26, 1994, 002:003, p. 1-15, TowerGroup.
Medeiros, Workflow Software in Banking: Update, The Tower Group, Apr. 30, 1996, 008:006 (replaces 002:003 (Jan. 1994), p. 1-12, TowerGroup, Wellesley, MA, USA.
Memo, Requirements for Image Quality Capture Workstation Software, To: Susan West, Jo Sander, cc: Fred Strange, Larry Ng, From: Lyle Weaver, Jan. 23, 1995, p. JPMC 000853-000863.
Methodology and Value (Presentation), Image Archive Forum, Sep. 19, 1997, p. 1-20; Economic Framework, Jan. 27, 1998 cover page.
Michigan National: First to the IBM Image Statement Punch, Factiva [On-line], Feb. 20, 1992 [Retrieved Jun. 20, 2003], vol. 3, No. 4, ISSN: 1048-5120, Phillips Publishing, Inc. Retrieved from the Internet: <URL:http://global.factiva.com/en/arch/print_results.asp.
Morrall, Katherine, "The Democratization of Imaging," *Bankers Monthly*, Special Insert, May 1991, vol. CVIII, No. 5, 5 pages.
Multipurpose Image Processor With Compact Unit, DialogNews Document [On-line], Nov. 12, 1990 [Retrieved Feb. 10, 2003], Nov. 12, 1990, No. 728, p. 54, Electronic Buyers' News. Retrieved from the Internet: <URL:http://www.dialogselect.com/news/cgi.
Murphy, Electronic Check Clearing Alternatives Take Shape, ABA Banking Journal, pp. 62-66, May 1993.
Nacha's Electronic Check Council to Push for POS Check Truncation, Factiva [On-line], Mar. 16, 1995 [Retrieved Jun. 24, 2003], vol. 6, Issue: 5. Retrieved from the Internet: <URL:http://global.factiva.com/en/arch/print_results.asp.
Name of Attendees Offerors Conference, pp. 1-2, May 13, 1994.
National City Enhances Wholesale Lockbox Features, DialogNews Document [On-line], Feb. 29, 1996, 11:18 EST [Retrieved Feb. 10, 2003], PR Newswire. Retrieved from the Internet: <URL:http://www.dialogselect.com/news/cgi.
National City, NCR form strategic imaging partnership, AT&T News Release [On-line], Nov. 9, 1992 [Retrieved Nov. 15, 2002]. Retrieved from the Internet: <URL:http://www.att.com/news/1192/921109.nca.html.
NCR and Unisys exchange check images in a pivotal test, DialogNews Document [On-line], Apr. 8, 1993 [Retrieved Nov. 20, 2002], vol. 158, No. 67, p. 3(1), American Banker. Retrieved from the Internet: <URL:http://www.dialogselect.com/news/cgi.
NCR demonstrates full line of retail products at NRF conference, AT&T News Release [On-line], Jan. 18, 1993 [Retrieved Nov. 15, 2002]. Retrieved from the Internet: <URL:http://www.att.com/news/0193/930118.ncd.html.
NCR deposit processing technology speeds banking operations, AT&T News Release [On-line], Dec. 7, 1992 [Retrieved Nov. 15, 2002]. Retrieved from the Internet: <URL:http://www.att.com/news/1292/921207.ncc.html.
NCR Document Management System includes Kodak, Ricoh products, AT&T News Release [On-line], Apr. 6, 1993 [Retrieved Nov. 15, 2002]. Retrieved from the Internet: <URL:http://www.att.com/news/0493/930406.ncc.html.
NCR Helps to Speed Up Check Processing, DialogNews Document [On-line], May 2, 1997 [Retrieved Feb. 10, 2003], p. N/A, Newsbytes News Network. Retrieved from the Internet: <URL:http://www.dialogselect.com/news/cgi.
NCR introduces Scalable Image Item Processing Solution, AT&T News Release [On-line], Jan. 19, 1996 [Retrieved Nov. 15, 2002]. Retrieved from the Internet: <URL:http://www.att.com/news/0196,960119.nca.html.
NCR Renames SIIPS, Plans New Sorters, DialogNews Document [On-line], Mar. 13, 1997 [Retrieved Feb. 10, 2003], vol. 8, No. 5, p. N/A, Item Processing Report. Retrieved from the Internet: <URL:http://www.dialogselect.com/news/cgi.
NCR signs DSI alliance for imaging statement processing, AT&T News Release [On-line], Jul. 20, 1992 [Retrieved Nov. 15, 2002]. Retrieved from the Internet: <URL:http://www.att.com/news/0792/920720.nca.html.
NCR Unveils Client-Server Check Imaging, DialogNews Document [On-line], Mar. 1996 [Retrieved Oct. 24, 2002], vol. 9, No. 3, p. 23, Bank Technology News. Retrieved from the Internet: <URL:http://www.dialogselect.com/news/cgi.
NCR Unveils First Multipurpose PC-based Imaging Product, DialogNews Document [On-line], Oct. 29, 1990 [Retrieved Feb. 10, 2003], p. 1, News Release. Retrieved from the Internet: <URL:http://www.dialogselect.com/news/cgi.
NCR Unveils SIIPS New Product Features POD, Customer-Facing Applications, Factiva [On-line], Jan. 18, 1996 [Retrieved Jun. 25, 2003], vol. 7, Issue: 1, Phillips Business Information, Inc. Retrieved from the Internet: <URL:http://global.factiva.com/en/arch/print_results.asp.
NCR, CKI to market image-based credit card chargeback system, AT&T News Release [On-line], Jan. 6, 1993 [Retrieved Nov. 15, 2002]. Retrieved from the Internet: <URL:http://www.att.com/news/0193/930106.ncb.html.
NCR: NCR introduces 7780 item processing system; image-based systems scans and reads documents, DialogNews Document [On-line], Mar. 11, 1992, 06:00 PT [Retrieved on Feb. 10, 2003], Business Wire. Retrieved from the Internet: <URL:http://www.dialogselect.com/news/cgi.
NCR: NCR unveils first multipurpose PC-based imaging product, DialogNews Document [On-line], Oct. 29, 1990, 12:09 PT

[Retrieved Feb. 10, 2003], Business Wire. Retrieved from the Internet: <URL:http://www.dialogselect.com/news/cgi.

NCR's ATM Captures Images at the Point of Deposit, Factiva [On-line], Dec. 24, 1992 [Retrieved Jun. 20, 2003], vol. 3, No. 25, ISSN: 1048-5120, Phillips Business Information, Inc. Retrieved from the Internet: <URL:http://global.factiva.com/en/arch/print_results.asp.

NCR's ATM captures images at the point of deposit. (NCR Corp.'s new automated teller machine) (Product Announcement), Dialog(R) File 148: Gale Group Trade & Industry DB, Jan. 20, 1993, 06397449/9, p. 1-4, The Gale Group.

New ATM from AT&T GIS features automated document processing, AT&T News Release [On-line], Nov. 29, 1994 [Retrieved Nov. 15, 2002]. Retrieved from the Internet: <URL:http://www.att.com/news/1194/941129.ncb.html.

New Guide Addresses Future of Payment Systems, Factiva [On-line], Apr. 29, 1993 [Retrieved Jun. 20, 2003], vol. 4, No. 8, ISSN: 1048-5120, Phillips Business Information, Inc. Retrieved from the Internet: <URL:http://global.factiva.com/en/arch/print_results.asp.

New image-based systems target low-volume shops, DialogNews Document [On-line], Apr. 10, 1996 [Retrieved Feb. 10, 2003], vol. 13, p. 7(1), Financial Services Report. Retrieved from the Internet: <URL:http://www.dialogselect.com/news/cgi.

New York Clearing House CHECCRS Project, New York Clearing House, Feb. 25, 1994.

Newman, et al., Cryptography in the Private Sector, IEEE Communications Magazine, vol. 24, No. 8, pp. 7-10, Aug. 1986.

News Briefs, Factiva [On-line], Nov. 6, 1997 [Retrieved Jun. 20, 2003], vol. 8, Issue: 22, Phillips Business Information, Inc. Retrieved from the Internet: <URL:http://global.factiva.com/en/arch/print_results.asp.

Nixdorf Computer Introduces DCPA Image—A Sophisticated Document Image Processing System With Unique Capabilities, PR Newswire, Aug. 15, 1989.

Norwest Bank selects NCR image-based processing systems, AT&T News Release [On-line], Aug. 2, 1993 [Retrieved Nov. 15, 2002]. Retrieved from the Internet: <URL:http://www.att.com/news/0893/930802.nca.html.

Norwest Bank selects NCR image-based processing systems, AT&T News Release [On-line], Aug. 2, 1993 [Retrieved Feb. 10, 2003]. Retrieved from the Internet: <URL:http://www.att.com/news/0893/930802.nca.html.

NYCH Gears Up for ECP Pilot, Factiva [On-line], Aug. 6, 1992 [Retrieved Jun. 20, 2003], vol. 3, No. 15, ISSN: 1048-5120, Phillips Publishing, Inc. Retrieved from the Internet: <URL:http://global.factiva.com/en/arch/print_results.asp.

O'Sullivan, Orla, "Data warehousing—without the warehouse," ABA Banking Journal, Dec. 1996, vol. LXXXVIII, No. 12, pp. 3, 42-44.

On the imaging technology front, DialogNews Document [On-line], Apr. 10, 1996 [Retrieved Nov. 20, 2002], vol. CLXI, No. 68, p. 26, American Banker. Retrieved from the Internet: <URL:http://www.dialogselect.com/news/cgi.

Online Library, Payment Solutions Collection, IBM, Dec. 1998.

Open Scan Technologies and Aquracy.com Team to Speed Exception-Mail Handling, DialogNews Document [On-line], Mar. 7, 2000 [Retrieved Feb. 10, 2003], p. 0480, Business Wire. Retrieved from the Internet: <URL:http://www.dialogselect.com/news/cgi.

Optika, Factiva [On-line], Oct. 1, 1992 [Retrieved Jun. 20, 2003], vol. 3, No. 19, ISSN: 1048-5120, Phillips Business Information, Inc. Retrieved from the Internet: <URL:http://global.factiva.com/en/arch/print_results.asp.

Payments, Clearance, and Settlement, A guide to the Systems, Risks, and Issues, United States General Accounting Office, Report to the Chairman Committee on Banking and Financial Services, House of Representatives, GAO/GGD-97-73, pp. 1-189, Jun. 1997.

PC Image Remittance Systems Vendors Beef Up Features, Factiva [On-line], Mar. 5, 1992 [Retrieved Jun. 20, 2003], vol. 3, No. 5, ISSN: 1048-5120, Phillips Publishing, Inc. Retrieved from the Internet: <URL:http://global.factiva.com/en/arch/print_results.asp.

Pilot Overview—Options 1-3, Addendum and 3 Figures, Apr. 3, 1995, p. 1-5.

Planning and Installation Guide, NCR 7731 Personal Image Processor, (D1-2302-D), 1993, NCR Corporation.

Plesums, C.A., et al., "Large-scale image systems: USAA case study," IBM Systems Journal, vol. 29, No. 3, 1990, pp. 342-347.

POD Check Imaging Faces New Challenges, DialogNews Document [On-line], Mar. 1997 [retrieved Oct. 24, 2002], vol. 10, No. 3, p. 23, Bank Technology News. Retrieved from the Internet: <URL:http://www.dialogselect.com/news/cgi.

Product Description, 7731 Personal Image Processor [On-line] [Retrieved Feb. 10, 2003]. Retrieved from the Internet: <URL:http://www3.ncr.com/product/financial/fsgwat/7731.htm.

Product Overview, 7731 Low-volume Image Item Processor, NCR—Hardware—7731 [On-line] [Retrieved Feb. 10, 2003], Retrieved from the Internet: <URL: wysiwyg://25/http://www.ncr.com/products/hardware/hw_7731_product.htm.

Program Product, Electronic Payment Systems Support/Check Processing Control System: Program Reference and Operations Manual, Program No. 5734-F11, IBM, Fax from Meinert Engineering, Aug. 8, 2002, 7 pages.

R. Brown, ANSI X9.46 Data Structure Reference, IBM Corporation, Jul. 31, 1995, p. 1-16.

R. Brown, Preliminary Architecture and Project Plan, FSTC Image Interchange Project, Pilot Phase-1A, IBM Corporation, Jun. 30, 1995, p. 1-34.

Regions Bank Selects ImageSoft to Provide Imaging Solution, DialogNews Document [On-line], Sep. 16, 1997 [Retrieved Nov. 15, 2002], p. 9161220, Business Wire. Retrieved from the Internet: <URL:http://www.dialogselect.com/news/cgi.

Remittance Companies Eager to Embrace Uses for New Image Technology, Item Processing Report, Jul. 20, 1995, p. 1-10, vol. 6, No. 14, Phillips Business Information, Inc., Washington, DC, USA.

Remittance processing software released for community banks, DialogNews Document [On-line], Sep. 1, 1993 [Retrieved Feb. 10, 2003], vol. 10, No. 18, p. 6(1), Financial Services Report. Retrieved from the Internet: <URL:http://www.dialogselect.com/news/cgi.

Request for Proposal for Check Image Processing and Archival and Retrieval Systems for the Federal Reserve, Image Archival System RFP, FR-Internal, Version 1.0, Apr. 21, 1994.

Request for Proposal for Check Image Processing and Archival and Retrieval Systems for the Federal Reserve, Image Archival System RFP, Version 1.b, Revised May 26, 1994.

RFP Amendment, RFP Amendment, Offerors, Federal Reserve Bank of Boston RFP #0729, Apr. 12, 1995.

Robert J. Brown, ANSI X9.46 Data Structure Reference; Jul. 31, 1995, pp. 4-16.

Roush, Crain's Detroit Business, MSW—Draft, pp. 306-308, Aug. 6, 2003.

S. Helm, Who's doing what in image processing, DialogNews Document [On-line], Jan. 1991 [Retrieved Nov. 15, 2002], vol. 83, No. 1, p. 31(3), ABA Banking Journal. Retrieved from the Internet: <URL:http://www.dialogselect.com/news/cgi.

S. Marjanovic, Mich. National streamlines imaging with IBM system, American Banker, Sep. 13, 1995, p. 1-2, vol. 160, No. 176.

Santa Fe Firm Offers Long-Life Data, Data Channels, Jan. 15, 1996, vol. 23, No. 2, ISSN: 0092-7290, Information Access Company.

Scanning goes vertical: a big future for specialized check scanning; check scanning technology, Advanced Imaging, Oct. 1997, p. 42-44.

Secure Remote Access to Financial Services for the Financial Services Industry, Working Draft, American National Standard X9, American Bankers Association, Aug. 10, 1996, United States.

Seeberg, Advanced Document Processing at the Union Bank of Norway, IMC Journal, pp. 23-25, 1983.

Shawmut Saves $200,000 a Year With Image Exception System, Factiva [On-line], Dec. 9, 1993 [Retrieved Jun. 20, 2003], vol. 4, No. 24, ISSN: 1048-5120, Phillips Business Information, Inc. Retrieved from the Internet: <URL:http://global.factiva.com/en/arch/print_results.asp.

Signet Bank Processes Over 2,500 Documents/Hour in Unisys Check Imaging Tests, DialogNews Document [On-line], Apr. 9, 1991 [Retrieved Nov. 20, 2002], p. 0409P8428, PR Newswire. Retrieved from the Internet: <URL:http://www.dialogselect.com/news/cgi.

Softchec Licenses 'Envision' Image Solution to West Suburban Bank, Dialog News Document [On-line], Jan. 16, 1996 [Retrieved Nov. 15, 2002], p. 116SETU002, PR Newswire. Retrieved from the Internet: <URL:http://www.dialogselect.com/news/cgi.

Specifications for the Secure Hash Standard, Federal Information Processing Standards Publication 180, May 11, 1993, p. JPMC 000808-000852 (with attached memos).

Sterling Commerce Announces VECTOR:Capture for Prime Pass for NCR Transports, DialogNews Document [On-line], Feb. 28, 2000, 08:16 EST [Retrieved Feb. 10, 2003], Business Wire. Retrieved from the Internet: <URL:http://www.dialogselect.com/news/cgi.

Storage Technology and Data General Adopt DLT Tape Drives, Data Storage Report, May 1, 1996, Section: ISSN: 0267-5447, Information Access Company.

Systematics to use deposited-check imaging; installation at firm's N.J. center would be the first by an outsourcer, DialogNews Document [On-line], May 19, 1993 [Retrieved Nov. 20, 2002], vol. 158, No. 95, p. 3(1), American Banker. Retrieved from the Internet: <URL:http://www.dialogselect.com/news/cgi.

Taubert, C., "Workflow System Rids Branches of Paper," *Bank Systems Technology*, Jun. 1996, p. 26.

Telecom Advances May Cause Overhaul of Checking Industry, Factiva [On-line], Feb. 6, 1992 [Retrieved Jun. 20, 2003, vol. 3, No. 3, ISSN: 1048-5120, Phillips Publishing, Inc. Retrieved from the Internet: <URL:http://global.factiva.com/en/arch/print_results.asp.

Teller Hardware, Teller Hardware manufacturers [On-line], Mar. 28, 2001 [Retrieved Feb. 10, 2003]. Retrieved from the Internet: <URL:http://www.amarshall.com/resix/body_x_telh01.html.

The High-Quality Imaging Solution . . . for front or back office processing, 7731, 1999 NCR Corporation, Ohio, USA.

The Image and Check Processing; Truncation, Transmission Not Yet Here, But BancTec Takes a Major Step Forward, United States Banker, Feb. 1983, Section: p. 61, Faulkner & Gray.

The Leading Edge; Image processing technology: the pieces are falling into place, ABA Banking Journal, Nov. 1985, Section: Computers & Operations, p. 30, American Bankers Association.

Toward a new era of customer service, Bank Systems & Technology, Oct. 1995, vol. 32, No. 10, p. S2-S10, ISSN: 1045-9472; CODEN: BSEQD6, UMI, Inc.; ABI/INFORM.

Tracey, IBM Unveils First Stage of Image/Check System, Computers in Banking, vol. 7, No. 4, Apr. 1990.

Trafficking Invoices Behind the Freight, Modern Railroads, vol. 44, No. 19, pp. 46-47, Oct. 1989.

Tramer, Giving a Boost to Smaller Banks: Fed's Paperless Check Processing System Helps Little Guys Compete, MSW—Draft, pp. 260-261, Aug. 6, 2003.

TWS Systems Snags Contract, Factiva [On-line], Oct. 24, 1996 [Retrieved ???], vol. 7, Issue: 21, Phillips Business Information, Inc. Retrieved from the Internet: <URL:http://_.

Uhrich, The IBM ImagePlus High Performance Transaction System, Today, vol. 12, No. 7, May-Jun. 1992.

Unisys Enhances Check Imager, DialogNews Document [On-line], Oct. 24, 1994 [Retrieved Nov. 20, 2002], vol. CLIX, No. 205, p. 15A, American Banker. Retrieved from the Internet: <URL:http://www.dialogselect.com/news/cgi.

Unisys enters image processing market with two new products and major financial and industrial customers, DialogNews Document [On-line], Oct. 11, 1989 [Retrieved Nov. 20, 2002], p. 1011PH009, PR Newswire. Retrieved from the Internet: <URL:http://www.dialogselect.com/news/cgi.

Unisys integrates retail/wholesale lockbox solution for remittance processors, DialogNews Document [On-line], Mar. 25, 1997 [Retrieved Nov. 20, 2002], p. 03251075, Business Wire. Retrieved from the Internet: <URL:http://www.dialogselect.com/news/cgi.

Unisys Plans Payment Systems Reorganization, Item Processing Report, Nov. 23, 1995, p. 1-10, vol. 6, No. 23, Phillips Business Information, Inc., Washington, DC, USA.

Unisys provides services to Bank of the West to support retail banking, DialogNews Document [On-line], Sep. 18, 1995 [Retrieved Nov. 20, 2002], p. 9180098, Business Wire. Retrieved from the Internet: <URL:http://www.dialogselect.com/news/cgi.

Unisys solution will support check processing at Vermont Federal, DialogNews Document [On-line], May 20, 1996 [Retrieved Nov. 20, 2002], p. 5201185, Business Wire. Retrieved from the Internet: <URL:http://www.dialogselect.com/news/cgi.

Unisys Upgrades Its InfoImage TTPS/TCPS, Factiva [On-line], Jun. 9, 1994 [Retrieved Jun. 24, 2003], vol. 5, Issue: 11. Retrieved from the Internet: <URL:http://global.factiva.com/en/arch/print_results.asp.

Unisys wins contract to supply imaging solution to Chase Manhattan/ FISERV check processing alliance, DialogNews Document [On-line], Jun. 12, 1995 [Retrieved on Nov. 15, 2002], p. 6121175, Business Wire. Retrieved from the Internet: <URL:http://www.dialogselect.com/news/cgi.

Unix-based image statement software, DialogNews Document [On-line], Feb. 1993 [Retrieved Nov. 15, 2002], vol. 85, No. 2, p. 80(1), ABA Banking Journal. Retrieved from the Internet: <URL:http://www.dialogselect.com/news/cgi.

Use of High-Speed Image Remittance Systems Steadily Increases, Factiva [On-line], May 28, 1992 [Retrieved Jun. 20, 2003], vol. 3, No. 11, ISSN: 1048-5120, Phillips Publishing, Inc. Retrieved from the Internet: <URL:http://global.factiva.com/en/arch/print_results.asp.

Using the ImagPlus High Performance Transaction System (HPTS) with IBM System/390 Computers, IBM Corp., 1990.

Vendors plotting remittance strategies, DialogNews Document [On-line], Feb. 12, 1997 [Retrieved Feb. 10, 2003], vol. 14, p. 1(2), Financial Services Report. Retrieved from the Internet: <URL:http://www.dialogselect.com/news/cgi.

Vendors Roll Out Internet Modules, Factiva [On-line], Apr. 11, 1996 [Retrieved Jun. 27, 2003], vol. 7, Issue: 7, Phillips Business Information, Inc. Retrieved from the Internet: <URL:http://global.factiva.com/en/arch/print_results.asp.

Vendors Take Image Interchange Into Their Own Hands, Factiva [On-line], Apr. 15, 1993 [Retrieved Jun. 20, 2003], vol. 4, No. 7, ISSN: 1048-5120, Phillips Business Information, Inc. Retrieved from the Internet: <URL:http://global.factiva.com/en/arch/print_results.asp.

Verifone software links PCs to the point of sale, DialogNews Document [On-line], Aug. 16, 1993 [Retrieved Nov. 25, 2002], vol. 158, No. 156, p. 13A(1), American Banker. Retrieved from the Internet: <URL:http://www.dialogselect.com/news/cgi.

VSoft Offers Check Imaging, Factiva [On-line], Oct. 10, 1996 [Retrieved ??], vol. 7, Issue: 20, Phillips Business Information, Inc. Retrieved from the Internet: <URL:http://_.

Wagner, Sizing Up the Impact of Image Processing, Computers in Banking, vol. 6, No. 6, pp. 22, 68, Jun. 1989.

Wells, Bev, "Why digitations means dollars: The corporate stake in bank imaging," *Corporate Cashflow*, vol. 15, No. 9, Aug. 1994, p. 1 and pp. 30-32.

Western Bank purchases NCR's Document Managing System, AT&T News Release [On-line], Aug. 31, 1993 [Retrieved Nov. 15, 2002]. Retrieved from the Internet: <URL:http://www.att.com/news/0892/930831.nca.html.

When clients need to check, Continental's quick with a fax, DialogNews Document [On-line], Nov. 8, 1993 [Retrieved Feb. 10, 2003], vol. 158, No. 214, p. 8A(2), American Banker. Retrieved from the Internet: <URL:http://www.dialogselect.com/news/cgi.

Yes, Virginia, There is a Payback to Imaging, Factiva [On-line], Dec. 19, 1996 [Retrieved Jun. 26, 2003], vol. 7, Issue: 25, Phillips Business Information, Inc. Retrieved from the Internet: <URL:http://global.factiva.com/en/arch/print_results.asp.

AT&T SIIPS Proof-of-Deposit Operations Guide, General Information; 1995.

AT&T SIIPS Proof-of-Deposit System Administration Guide; 1995.

BancorpSouth Inc. Decentralizes Check Capture and Image with BISYS®' Document Solutions [On-line]; Jun. 2000.

Capture and Processing Overview, 5 pages; 1996.

CPCS Mass Data Set, 1-92 CPCS Programming and Diagnostic Guide; Aug. 8, 2002.

Crowe, Marianne, "Imaging: Getting Clear Benefits," *Bank Systems—Technology*, pp. 42, 43, and 1-3; Nov. 1994.

Current Check Flow (Gheck(1).ppt), p. 1-4; 1996.

Financial Services Technology Consortium (Ansi6v4(1).ppt), p. 1-27; Sep. 30 to Oct. 1, 1996.

Foreword, Parts I-II with Appendices, p. i-50; 1999.

FSTC Interbank Check Image Project (no1016v4(1).ppt), p. 1-18; 1996.

FSTC Interbank Check Imaging Project, Summary Report, p. 1-11; 1996.
Gibbs, Mark, "Networks up close and In depth," *January INFORM*, pp. 17-22.; 1994.
Image Archive Forum, Payments System Task Force, 5 pages; 1997.
Image Archive Forum, Payments System Task Force, Flow No. 1-13; 1997.
Interbank Check Imaging Networking Requirements & Costs (Presentation), 9 pages; 1995.
Kulkosky, Victor, "Wall Street Wakes Up to Image Management," *Wall Street Computer Review*, pp. 39-42; Mar. 21, 2008.
Medeiros, David, "Check image in proof-of-deposit: update," *The Tower Group*, Category: Industry Case Study, check imaging, D100-300.; 1996.
Medeiros, David, "Check image technology in corporate cash management application," *The Tower Group*, Category: check imaging, Industry Case Study, image lockbox, D100-200; 1996.

O'Donnell, Dorothy, "The Productive Alternative," *October Inform*, Banking: Financial, and Insurance Case Studies, pp. 3, 46-48, and 50; 1996.
O'Keefe, Michele, "Signet's View: Image is (Almost) Everything," *Bank systems—Technology*, pp. 34+; Dec. 1994.
Outlaw, Nowell, "Novell, Inc., "*January Inform*, pp. 36-37; 1994.
Some Issues Related to Check Image Compression, p. JPMC 000920-000930; Jan. 11, 1994.
Sullivan, Deidre, "Bank Technology Trick or Treat?." *Beyond Computing for Financial Services*, Premier Edition, vol. CIX, No. 11, pp. 10-20; Nov. 1992.
The Image Forum, Feb. 28-29; Grand Hotel; Atlanta, GA, Global Concepts HomePage [On-line]; 1996.

* cited by examiner

METHOD AND SYSTEM FOR PROCESSING FINANCIAL INSTRUMENT DEPOSITS PHYSICALLY REMOTE FROM A FINANCIAL INSTITUTION

CROSS-REFERENCE TO RELATED PATENT APPLICATIONS

This application is a Continuation of Divisional U.S. application Ser. No. 12/210,593, filed Sep. 15, 2008, which is a Divisional of U.S. application Ser. No. 10/914,151, filed Aug. 10, 2004, which is a Divisional of U.S. application Ser. No. 09/560,779, filed Apr. 28, 2000. The entire contents of the aforementioned applications are incorporated herein by reference.

BACKGROUND OF THE INVENTION

1. The Field of the Invention

The present invention relates to physical financial instrument processing. More particularly, the present invention relates to a method and system for remotely processing checks through electronic interaction between the physical location of the instrument and a financial institution.

2. Related Applications

The act of depositing or otherwise converting a financial instrument such as a check, draft, or other instrument has generally required the physical presentment of the instrument by the bearer to a financial institution such as a bank, credit union, or other institution authorized to accept and process monetary instruments. Indeed, the depositing and clearing of checks has heretofore involved individuals or organizations physically taking their deposit, such as in the form of a check, to financial institutions or trusted remote institutional branches, otherwise known as the bank of first deposit, where the deposit may be accepted, and credited to the bank customer's account, of course, subject to the check "clearing" with the maker financial institution.

Financial institutions have developed methods for reducing the amount of paper flow associated with checks within their organizations, however, their target has not been to reduce processing costs, improve the timeliness of the money collection from other financial institutions, and reduce costs associated with handling, storing and returning paper checks to the maker. Therefore, it would be an advancement to provide a new system centered on electronic information that does not require the use of paper items for any purpose.

Therefore, it would be advantageous to provide an electronic processing system and method that could provide a bearer of a check the convenience to "deposit" a check at a facility, such as a home or office, that is not a traditional bank or bank branch facility.

It would also be advantageous to provide a method and system for allowing the remote depositing and processing a check that does not require the physical routing of the actual check in order to accomplish the various post-deposit processing of a check. It would yet be a further advantage to provide a method and system for improving the collection time involved with the funds represented by the check (i.e., reduce credit "float").

It would be a benefit to provide a method and system for reducing expenses associated with the transportation costs involved in sending the checks from the bank of first deposit to the maker financial institution.

It would also be a benefit to provide a method and system for reducing the check storage expenses incurred by the bank of first deposit.

It would be a further benefit to enable the bank of first deposit to reduce the staffing, facilities (i.e., physical buildings), and equipment required to accept and process physical checks.

SUMMARY AND OBJECTS OF THE INVENTION

The present invention has been designed to reduce the issues associated with the physical handling of paper items by financial institutions and to improve the collections of associated funds by processing electronic images of checks as opposed to the slower method of sending paper checks through the traditional check clearing routes. Not withstanding the premise for the inventive processes to use electronic images of items to facilitate processing and clearing of items, it would also be desirable for the present invention to accommodate the current use of paper items and all other commonly accepted methods for clearing checks until such time as the use of electronic images becomes a common accepted practice for clearing checks.

This new process involves inventive computer-based software that can be used at financial institution locations and locations remote from financial institution offices for capturing deposits, together herein referred to as remote locations. The remote capture system can be used by individuals and businesses (including the financial institution) to capture deposit information and images of the monetary items, such as checks, required for depositing the checks into their deposit accounts at the financial institution. Once this information is captured and validated at the remote site, it is transferred to the financial institution over telecommunications lines (leased lines, switched lines, Internet, etc.) to a receiving computer at the financial institution. The financial institution computer verifies the information received, stores the image of the items, and passes back to the remote site computer information that is used by the remote site computer to endorse, cancel, and item number, and otherwise mark, void, and identify the check. Another image of the check is then created at the remote location showing the endorsements information. This image is then sent to the central site of the financial institution for storage and to be used for research and re-depositing of the check if this becomes necessary. The depositor retains the deposit slips and monetary item(s) at the remote site.

As an alternative to the interactive process of passing voiding, endorsing, unique number information back and forth between the central site and the remote site, it will be possible (based on parameters set in the inventive software) to do most of the decision-making on the remote site processor before transmitting the check information to the central site. This can be done by pre-loading the endorsement, voiding, and item numbering information on the remote site processor and/or updating on a regular basis. This allows for checks to be endorsed, voided and item numbered and the image(s) associated with a check deposit to be created and passed to the central site without the need for interactive validation of data between the remote and central sites.

In addition to deposits, decisions based on remote site information, the present invention also allows deposits of any number, combination, and dollar amounts of deposit, and checks based upon decisions made regarding the customer by information stored at the central site. This information can be loaded onto the central site and communicated to the remote processor as part of the interactive exchange of data during the process of validating the deposit. Additionally, this information while being pre-loaded on the remote processor can also be updated on a regular basis.

Once complete deposit data is received by the central site processor at the bank of first deposit's central site, it is passed to the central site's check processing, deposit, and cash management, etc., systems for processing. As an alternative, if the remote site or central site is being used as a collection center for deposits from other institutions, the deposit information can be passed to the other institutions check processing, deposit, and cash management, etc., systems for processing. The image of the checks can be used to either print the customer statements (for items drawn on the bank of first deposit or routed through the normal check clearing paths (i.e. directly to clearing and correspondent banks or through the FRB electronic clearing process). If the maker or maker bank(s) require physical checks for their internal purposes, a duplicate check is printed by either the bank of first deposit's central site, or the maker bank or by the maker banks FRB.

Once received by the maker bank, the check image or duplicate printed check is processed by the maker bank through their computer systems and included as per their policies in their customer statements. Checks returned to the depositor for any reason will take the reverse path back to the depositor. Any re-depositing of items by the original depositor is done using the either the printed duplicate paper item (if there is one) or the original endorsed image created and stored at the bank of first deposit's central site.

All transmission of data preferably undergoes digital signature verification and certification and data encryption to ensure privacy and confidentiality of the data being transmitted. In addition, the check images will be stored on a document storage database at the remote site or bank of first deposit as well as Internet enabled and accessible database(s). The information on these database(s) will be available to the depositor and research personnel at the bank of first deposit's central site under security control through remote access such as Internet access.

The system includes computer hardware, computer software, apparatus, and methodology that enables individuals, businesses, and all types of organizations (both for profit and non-profit) to capture and securely transmit check images (including, but not limited to, personal checks, business checks, travelers checks money orders, merchant coupons, food coupons, line of credit checks, etc.), deposit information, and other information from remote locations (i.e., locations that could include the financial institution's remote locations, other financial institution's locations, businesses, private residences, etc.), for the purpose of having those checks credited to the depositing individual's or organization's bank account(s) and having the check images (and/or physical checks) entered into the bank check clearing channels for ultimate delivery to the maker bank for payment out of the maker's account.

These and other objects and features of the present invention will become more fully apparent from the following description and appended claims, or may be learned by the practice of the invention as set forth hereinafter.

BRIEF DESCRIPTION OF THE DRAWINGS

A more extensive description of the present invention, including the above-recited features, advantages, and objects, will be rendered with reference to the specific embodiments that are illustrated in the appended drawings. Because these drawings depict only exemplary embodiments, the drawings should not be construed as imposing any limitation on the present invention's scope. As such, the present invention will be described and explained with additional specificity and detail through use of the accompanying drawings in which.

DETAILED DESCRIPTION OF THE PREFERRED EMBODIMENTS

Figure 1:
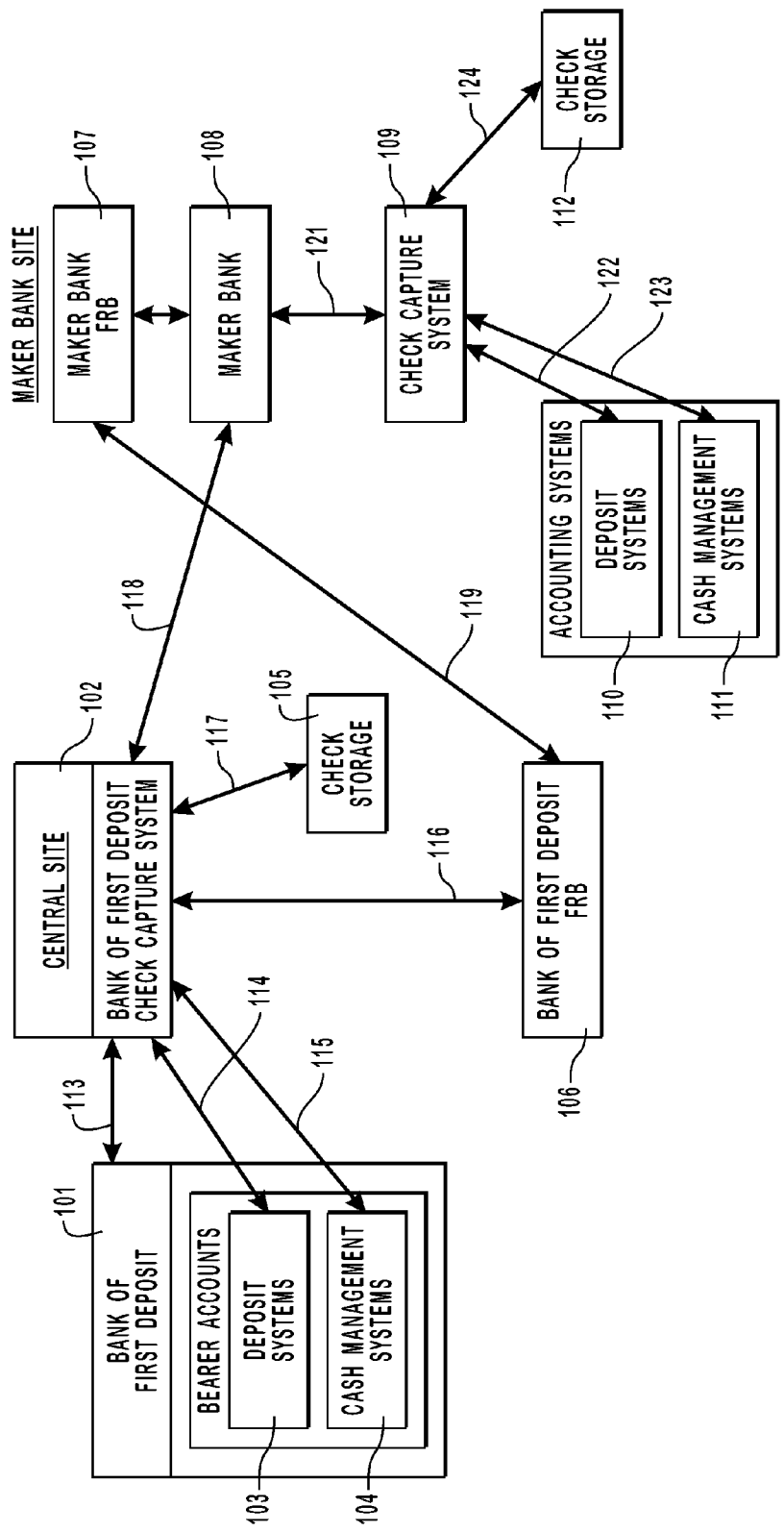
FIG. 1 illustrates an overview of a process of capturing and processing deposits from financial institutions and their branches which can be adapted to incorporate some of the features of the present invention.

The invention is described below with reference to drawings. These drawings illustrate certain details of specific embodiments that implement the systems and methods of the present invention. However, describing the invention with drawings should not be construed as imposing, on the invention, any limitations that may be present in the drawings. The present invention contemplates both methods and systems for remotely accepting a check for deposit and electronically processing the deposit without physically routing the physical paper copy of the check. The embodiments of the present invention may comprise a special purpose or general purpose computer including various computer hardware, the execution unit portion of which may also be known herein as a "processor."

Embodiments within the scope of the present invention also include computer-readable media for carrying or having computer-executable instructions or data structures stored thereon and also known as software. Such computer-readable media can be any available media which can be accessed by a general purpose or special purpose computer. By way of example, and not limitation, such computer-readable media can comprise RAM, ROM, EPROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. Computer-executable instructions may also be properly termed "software" as known by those of skill in the art.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the portions of the invention includes a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Program code or software means comprising one or more program modules may be stored on the hard disk, magnetic disk, optical disk, ROM or RAM, including an operating system, one or more application or software programs, other program modules, and program data.

The computer may operate in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet.

It should also be pointed out that while the term "check" may be generically used herein, it is contemplated by the inventors that other financial instruments are also contemplated within this meaning and therefore, the use of the term "check" is assumed to have the broader meaning, both in the specification and the claims.

Additionally, the term "bank of first deposit" means the financial institution sponsoring the remote site and which owns or employs a central site for processing financial transactions.

Referring to FIG. 1, a bank of first deposit 101 receives a check from the bearer to begin processing the instrument. Bank of first deposit 101 actually forwards, in step 113, the physical check(s) to a central site 102 for additional physical processing of the actual check. The physical check is processed at central site 102 using a reader/sorter (not separately shown but included in 102) to acquire information such as the information stored on the Magnetic Ink Character Recognition (MICR) line. This information includes the maker bank number, the account number, a check serial number, etc. The information from the check is then sent to an in-house computer system (included in 102) for posting in steps 114, 115 to the appropriate bearer account(s) 103, 104 in the bank of first deposit 101. If the check is an on us item (i.e. an item that is drawn on the bank that is processing it), the check is retained in a step 117 at storage 105 at bank of first deposit 101, otherwise the check is sent in steps 116 and 119 or, alternatively in step 118 into a maker bank 108 for collection of funds. The check(s) are either sent physically in step 118 directly to maker bank 108 or routed in steps 116 and 119 through a Federal Reserve Banks (FRB) 106 and 107 check clearing processes to a maker bank 108.

The path taken by the check is determined by the working agreement that bank of first deposit 101 has with maker bank 108. If maker bank 108 is a member of the local clearinghouse association (thereby being a clearing bank), the checks can be exchanged directly with maker bank 108. If the maker bank 108 is a correspondent bank (a bank that has agreed to exchange checks directly with the bank of first deposit) the checks can be sent directly to maker bank 108. All other checks are forwarded in steps 116 and 119 to the FRBS, 106 and 107 for exchange with maker bank 108. If a check is not paid by maker bank 108 for any reason (i.e. it is a forgery, there are not sufficient funds in the makers account to cover the amount of the check, etc.) the check is returned to the depositor using the reverse path. Once the check is received by maker bank 108, the check is processed in step 121 through the maker bank's check capture system 109. Information from the check is then sent in steps 122 and 123 to the maker bank's accounting systems 110 and 111 and the checks are either stored in step 124 at the maker bank's check storage 112, or sent directly to the maker with their check statement.

Figure 2:
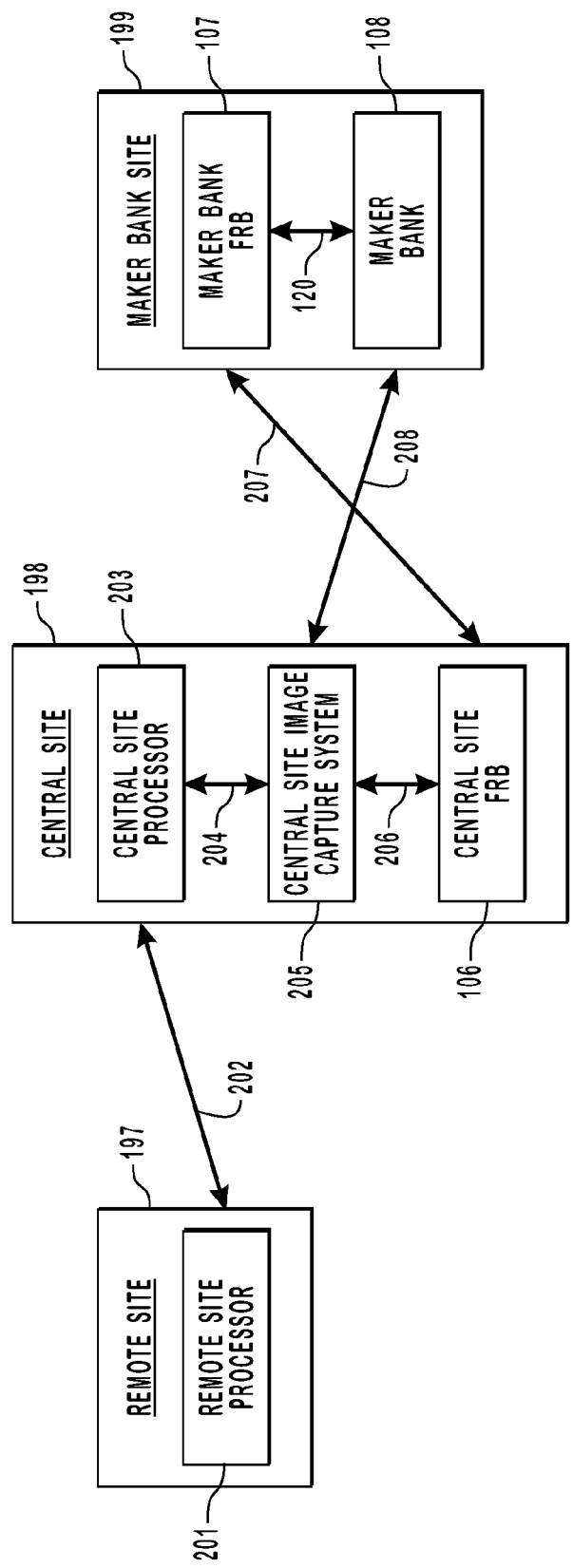
FIG. 2 illustrates an overview of remotely capturing and processing deposits remote from a financial branch or bank, in accordance with a preferred embodiment of the present invention.

FIG. 2 depicts a high-level processing diagram of the various entities involved in the overall financial processing of the present invention, in accordance with the preferred embodiment. The present invention comprises three primary processing entities: (i) a remote site 197, (ii) a central site 198, and (iii) a maker bank site 199. Each of these sites enlists specific processing techniques which furthers the novel financial instrument processing technique of the present invention.

In the present invention, a remote site processor 201 (further detailed in FIG. 3) either autonomously, or under operator/depositor control initially remotely "processes" a check into electronic check data both in the form of image data and informational data which can be further processed and approved at subsequent portions of the overall process. In essence, the remote site provides a processing front-end that electronically interacts via interface 202 with central site 198 through the transfer of electronic check data for review and processing by electronic means at a central site. Remote site 197 performs functions relating to the physical check including scanning, reading, and printing on the checks. Remote site 197 also exchanges image and/or authorization data with the other entities as further described below.

Central site 198 of FIG. 2 interacts via interfaces 207, 208 with maker bank site 199 for completing the clearing process relating to the check or related instrument. Central site 198 is comprised of a central site processor 203 which coordinates verification and account interaction. Central site 198 also provides both electronic storage of image and information data as well as providing an interface to maker bank site 199. Central site 198 provides image conversion technology for converting check data from electronic form back to a hard copy check format for processing, printing, and archiving when required by more traditional banking processes. Otherwise, a system 205 may process the image of the check in image format. System 205 prevents the need to reprint the check and send the duplicate check through the check reader sorters.

Maker bank site 199 performs more traditional account processing of information received from central site 198 such as from central site Federal Reserve Bank 106. Maker bank site 199 is further comprised of maker bank FRB 107 and maker bank 108 and engages in account processing and statement generation.

Figure 3:
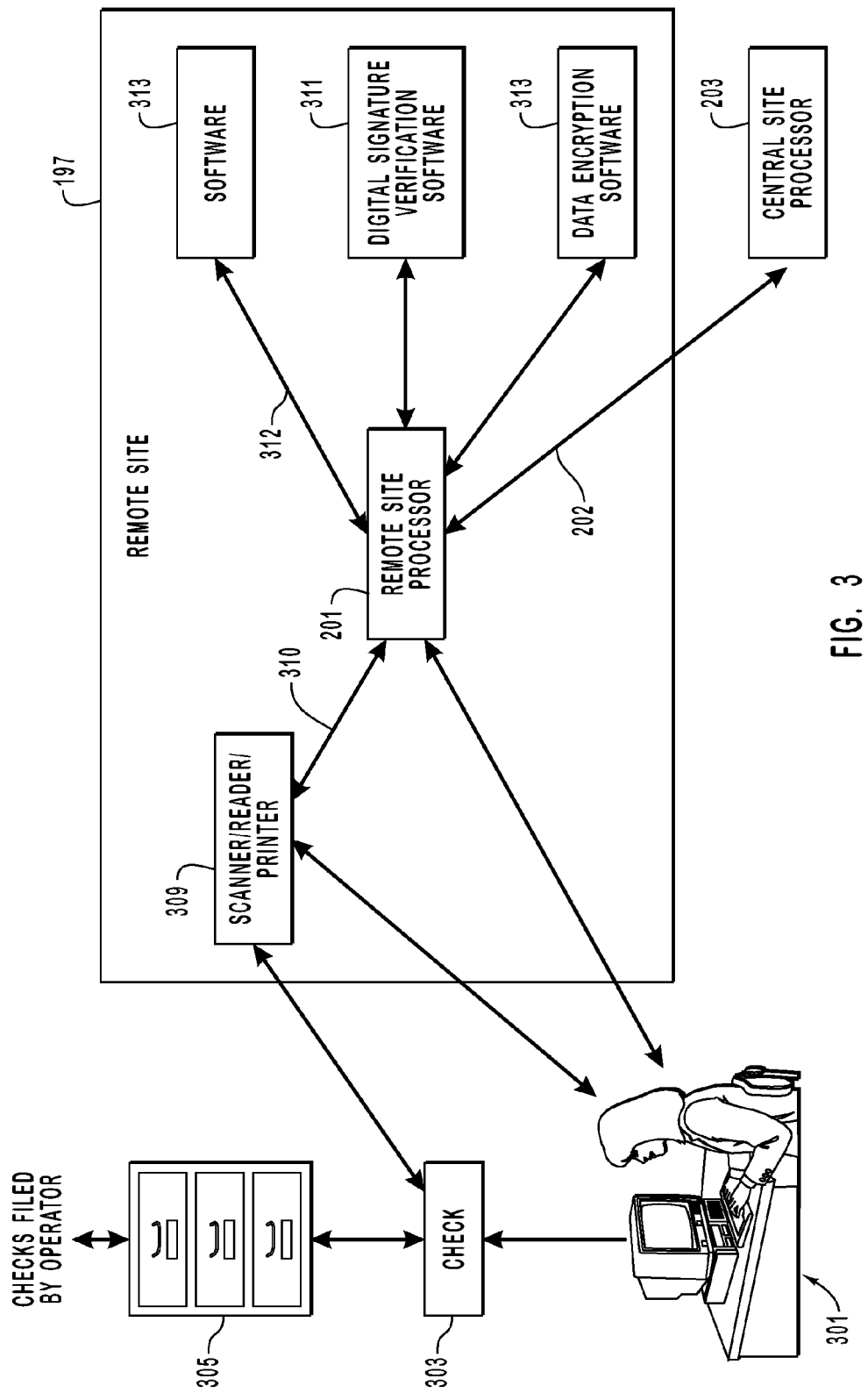
FIG. 3 is a more detailed block diagram showing the capturing and processing at the remote site or point of check presentment, in accordance with a preferred embodiment of the present invention.

FIG. 3 depicts the remote site as well as the interaction by a depositor or operator, in accordance with a preferred embodiment. The present invention commences with the presentation of a physical instrument such as a check by a bearer to remote site 197. A remote scanner/reader/printer 309 provides the interface to the bearer for presentment of the check. Remote scanner/reader/printer 309, in the preferred embodiment, is a multifunction device capable of independently performing each of the functions of scanning, reading, and printing upon the check or physical financial instrument. It is also contemplated that individual devices for performing each of these functions, scanning-reading-printing, may be integrated, whether automatically or manually, to perform the combination of functions upon the check.

Remote scanner/reader/printer 309 is connected via an interface 310 to remote processor 201. Remote site processor 201, like each of the other processor elements in the present invention, may be comprised of execution-capable devices, and is preferably comprised of a computer, such as a personal, network, or general purpose computer. Remote processor 201 is further coupled to central site processor 203 via an interface transmission or network media 202, which may take the form of one or more of wired or wireless media such as public switched lines, Internet or wide-area network connection, microwave, satellite, digital phone, private leased lines, or any other current or future acceptable communications facility and may further employ include encryption over the interface.

Remote site processor 201 executes according to executable instructions such as computer-executable instructions which are figuratively depicted in FIG. 3 as software 313. Software 313 is loaded or interfaces with remote processor 201 via a bus or other physical interface depicted as interface 312. Generally, software 313 is comprised of executable instructions for (i) causing remote site processor 201 to instruct and execute the necessary steps for capturing the check or financial instrument both physically and electronically, (ii) performing requisite data processing on the electronic data from the capturing step, and (iii) exchanging the captured data over interface or media 202 to central site processor 203 when appropriate.

While details relating to the processing and method steps executed by remote site processor 201 via software 313 are described below, remote site processor 201 further determines if remote processing decisional information such as comparison information for making decisions on the number of deposits, dollar amount of deposits or dollar amount of monetary items is available on remote site processor 201. If such decisional information is not available at remote site 197, then central site check processing may require additional steps. Remote site processor 201 also determines if the remote processing information needed to void, endorse and itemize number each check 303 is available to remote processor 201 for processing of check 303, according to the method of the present invention. If such remote processing information is available but not current, the remote processing information may be updated by either having the updated information manually entered, for example by way of an operator via a keyboard at terminal 301 attached to remote processor 201, or the updated information may be retrieved by remote processor 201, under the direction of software 313, from central site processor 203.

In a preferred embodiment, the updated information may be housed in a data set at central site processor 203 and updated by the bank of first deposit, affiliated with remote site 197 prior to loading to remote site processor 201. Remote site processor 201, executing software 313, then determines if all of the decisions concerning voiding, endorsing, item numbering, number of deposits, number of checks or dollar sizes of deposits or items can be made by remote site processor 201 by checking the remote processing information as pre-defined in remote site processor 201.

If the decisions on endorsing, voiding, item numbering, number of deposits, number or dollar amounts of deposits or monetary items can be made by remote site processor 201, then to ensure proper account processing of check 303, a depositor at terminal 301 is lead through a series of instructions to gather deposit information required to ensure credits are made to the appropriate deposit accounts(s). In one preferred embodiment, the deposit information is read, interpreted and entered automatically by reader/scanner/printer 309. In another embodiment, the deposit information is entered manually on, for example, terminal 301 attached to remote site processor 201. Additionally, during the practice of the invention, scanner/reader/printer 309 encodes check 303 with endorsement and voiding information in order to physically "void" check 303, thereby keeping check 303 from being re-transmitted, for example over media 202, or re-deposited at an actual financial institution location for an additional collection. In addition, a unique item identification number may be encoded on check 303 by remote site processor 201 via scanner/reader/printer 309 to aid in tracking data resulting from processing of check 303.

The process of the present invention continues when scanner/reader/printer 309 performs the functions of scanning check 303 to create electronic check data comprised of image data, informational data including MICR encoding (using either MICR, Optical Character Recognition (OCR) or other like techniques). Scanner/reader/printer 309 "voids" check 303 by endorsing check 303 and printing tracking data thereon. The electronic image data and informational data such as MICR information of the voided and endorsed check 303 is transferred over interface 310 to remote site processor 201 for processing which includes image integrity verification. When the image integrity is suspect, the integrity is enhance by either rescanning check 303 or, alternatively, by manual intervention by an operator at terminal 301. If check 303 is rescanned, scanner/reader/printer 309 does not reprint the endorsement, voiding and item numbering information on check 303.

Once the electronic image data and the MICR encoding for the first check 303 is determined to be readable and accurate, remote site processor 201 determines if this process should be repeated for additional deposits and/or monetary item(s). When remote site processor 201 determines that processing by scanner/reader/printer 309 of individual check(s), under the direction of remote site processor 201 has ended and that the information is complete and ready for transmission via interface/media 202, remote site processor 201 formats the electronic image data and the MICR encoding and adds any additional control information in preparation for transmission to central site processor 203. The physical check 305 is stored in file 305 at the remote site. In addition, the check image is stored on the remote site processor (i.e., magnetic disk, cd rom, etc. not shown on drawing.) Communications between remote site processor 201 and central site processor 203 preferably incorporates digital signature verification/certification performed by process 311 and data encryption performed by process 313 to ensure confidentiality.

Figure 4:
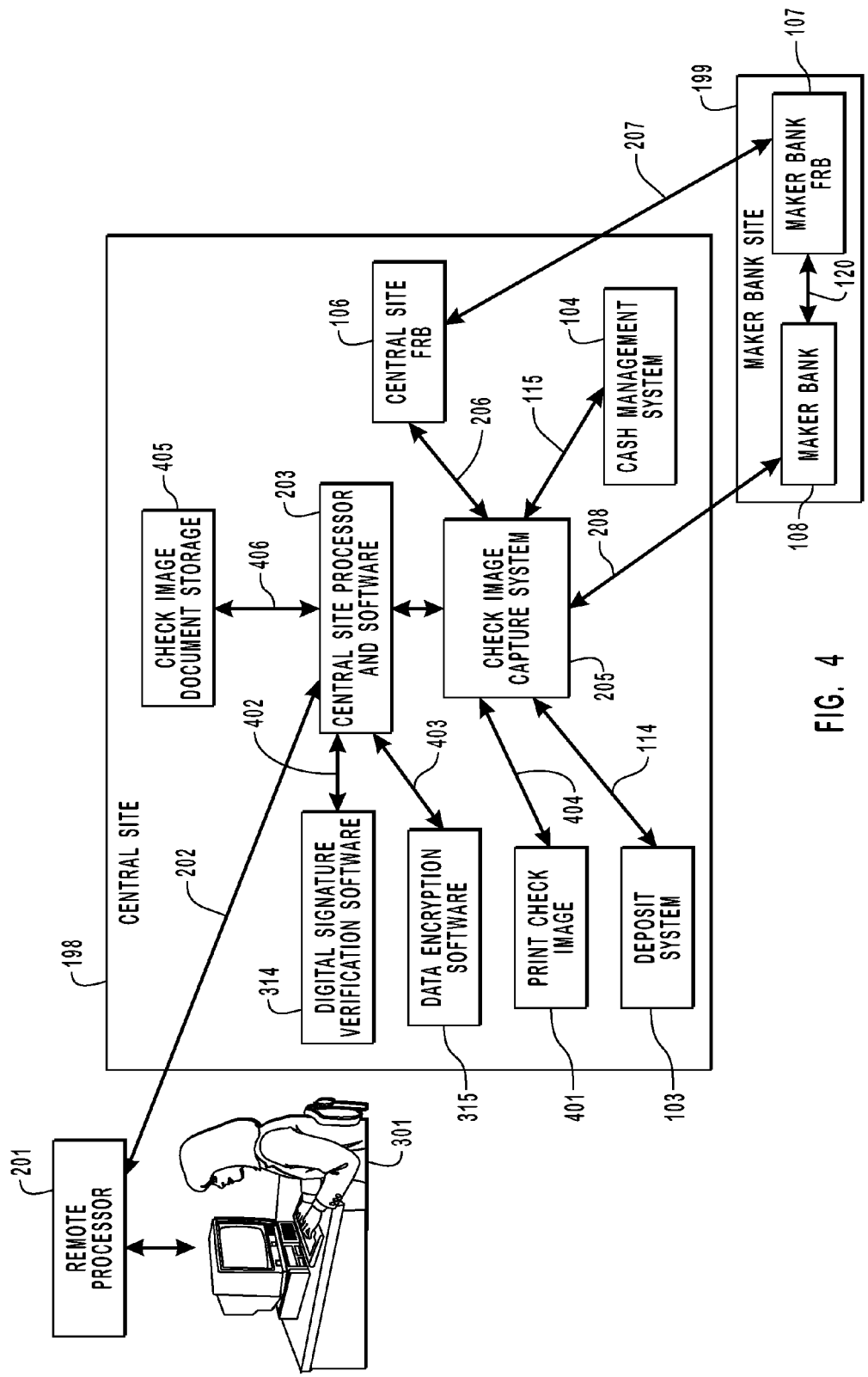
FIG. 4 illustrates central site processing of image data as captured at the remote site, in accordance with a preferred embodiment of the present invention.

FIG. 4 depicts the central site processor and the various processes and interfaces associated therewith, in accordance with a preferred embodiment of the present invention. While the accuracy of electronic check data transferred from remote site processor 201 to central site processor 203 will generally retain its integrity through the transmission, when electronic check data received by central site processor 203, as evaluated and processed by computer-executable instructions or software loaded therein, is incomplete or inaccurate, or if the image data is not readable, central site processor 203 communicates with remote processor 201 giving detailed information to an operator at terminal 301 concerning the need for additional information to restore image information or complete incomplete or inaccurate data. Depending upon the type of missing or otherwise incorrect information, corrected or supplemental information may be supplied by an operator at terminal 301 at remote site 197. It may even be necessary to re-scan check(s) 303 and re-transmit at least portions of the check data including image and/or MICR data to central site processor 203. If check 303 is re-scanned, then endorsement, voiding and item number information are not reprinted on check 303.

Once central site processor 203 determines the new check data received for the deposit is accurate and complete, central site processor 203 stores the check image and MICR data of check(s) 303 along with any additional associated information such as time that deposit was captured, who the customer was who captured the deposit, item number, etc. as received from remote site 201. Central site processor 203 confirms receipt of accurate information by sending a notification reply to remote site processor 201 freeing-up remote site processor 201 for further processing of subsequent remote check deposit interactions. In alternate embodiments, central site processor 203 may store image data on an Internet-enabled check image document storage 405 thereby allowing access by the depositor/operator from a terminal such as terminal 301, their designee, or the financial institution of first deposit. It should be pointed out that because of present banking processes, the remote site should still be associated with a chartered financial institution that is authorized to accept the checks from the remote site and process them through normal check clearing paths. The remote site may be a branch extension of the financial institution or may be a person, or other entity with or without a legal relationship to the financial institution that provides the access services to the financial institution. Such an affiliated financial institution is still known as the bank of first deposit. The present embodiment does not propose eliminating the bank of first deposit, only replacing the method used to capture deposits. Central site processor 203 maintains authentication and data integrity at check image document storage 405 through the use of digital signature verification and certification, as well as via data encryption as shown in processes 314 and 315.

Referring back to FIG. 3, in another embodiment, if the decisions of endorsing, voiding, item numbering, number of deposits number or checks or dollar amounts of deposits or monetary items cannot be made by remote site processor 201, for example, when the telecommunications line goes down and the decision information cannot be updated on the remote site processor, or when the central site processor is inoperable, or the specific remote site is not authorized to make these decisions (i.e. we will determine and pass that information to the remote site processor when the remote site processor contacts the central site processor prior to accepting deposit information at the remote site), then remote site processor 201 leads a depositor at for example terminal 301 through a series of instructions to gather deposit information required to ensure credits are made to the appropriate deposit accounts(s) 104. This can be done by either using the reader/scanner/printer 309 or by entering the necessary information on the terminal 301 attached to remote processor 201.

Then, check 303 is placed into the scanner/reader/printer 309 where the item is scanned, the MICR encoding is read preferably using either MICR or Optical Character Recognition (OCR) techniques, and an electronic image is created of check 303. The electronic image data and informational data such as MICR information is transferred from scanner/reader/printer 309 onto remote site processor 201 where remote site processor 201 edits and confirms that the electronic check data is readable. If the electronic check data is not readable or correct, the check data is corrected at the direction of remote site processor 201 by either re-scanning check 303 or having a remote site operator manually key the information in using terminal 301 or other interface device attached to remote site processor 201.

Once the check data is determined to be readable and accurate, remote site processor 201 then formats the scanned check data and adds additional control information in preparation for transmission to central site processor 203 and the alternate embodiment approach concludes.

Returning to FIG. 4, after receipt of valid and accurate check data, if it is determined that the maker bank or maker of the check requires a physical item, the check image is printed in process 401 and then processed through the central site check image capture system 205. If a physical item is not required, the image is sent to the check image capture system 205. In either case, the check image capture system 205 interfaces with the central site 198 deposit systems 103, cash management systems 104, etc. for posting information. The central site then forwards either the printed duplicate check or check image to the maker bank 108. This can be done directly through path 208 if the bank of first deposit's central site 198 has an agreement with maker bank 108 to exchange checks directly, or if the maker bank and the central site bank of first deposit do not have an exchange agreement then through FRBs 106, 107 through path 207.

Figure 5:
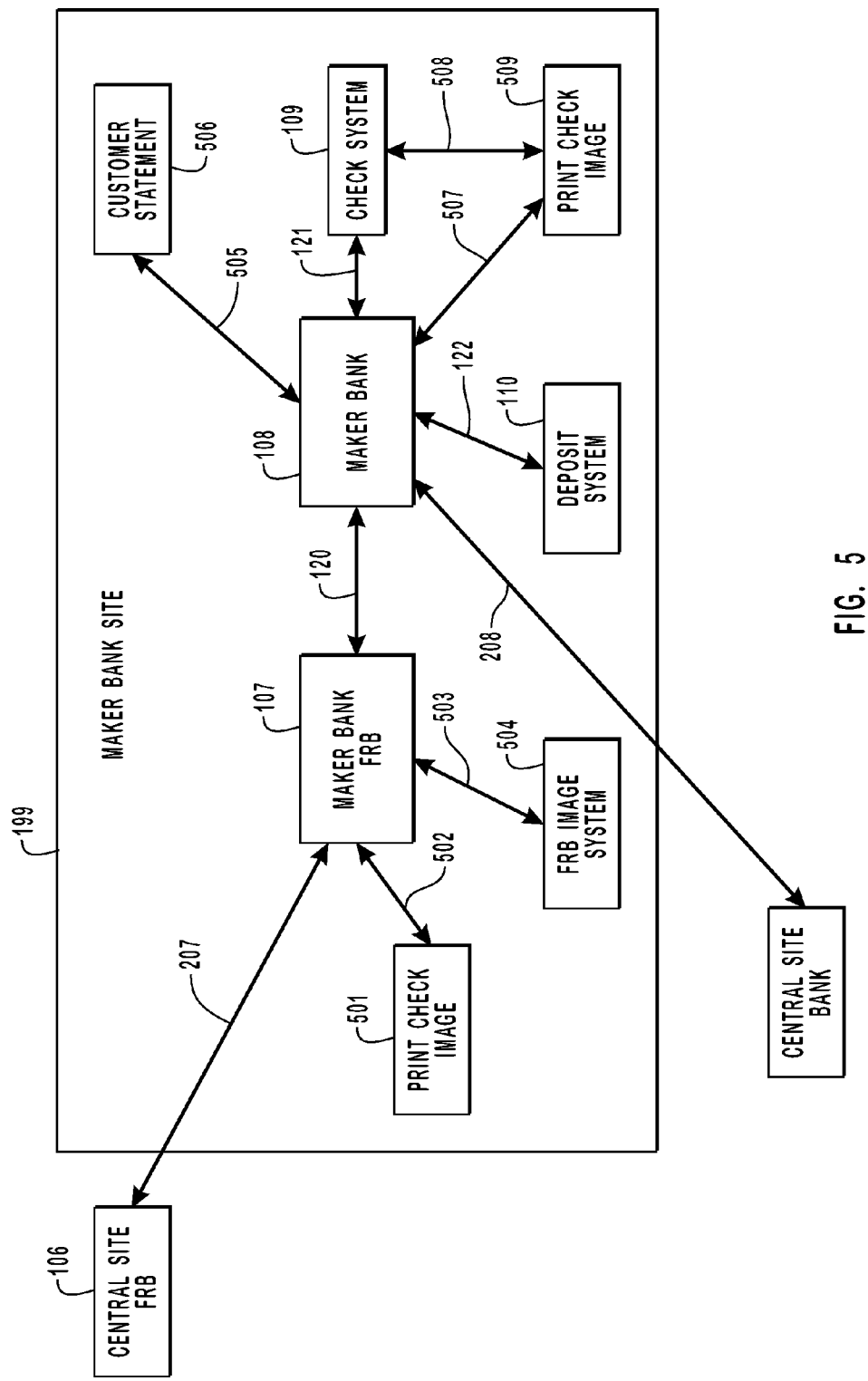
FIG. 5 illustrates processing at the maker or payor institution site, in accordance with a preferred embodiment of the present invention.

FIG. 5 depicts the various component and processes of the maker bank site, in accordance with the preferred embodiments of the present invention.

The maker bank 108 receives either images of the original paper items 303 or printed duplicates of the original paper items 303 either directly from the bank of first deposit's central site through path 208 or from the central site Federal Reserve Bank (FRB) 106 clearing process through path 206 (FIG. 4), 207, 120.

Central site FRB 106 will process the check images or paper items through their capture system and forward the images or paper items to the maker bank FRB 107 through path 207. The maker bank FRB then processes the items or images through their check capture system 504 through path 503 and if necessary, (i.e., when paper duplicate of item has not already been printed by the bank of first deposit), print a duplicate of the original check 303 image if a paper item is required by maker bank 108. A maker bank FRB 107 will then forward the printed items or images to the maker bank 108 via communications or transportation path depicted as path 120. Maker bank 108 will then process the image or paper item though their in-house application systems depicted by deposit system 110, print check image process, 509, check system process, and customer statement process 506 through paths 122, 507, 508, 121, 505, and 507.

These in house systems are not to be taken as systems that all banks will have or use for this process. They are meant to represent the in house processing by maker banks to post monetary items to their accounting systems and to send the items (either image or printed duplicate of original items) to the check maker.

Figure 6:
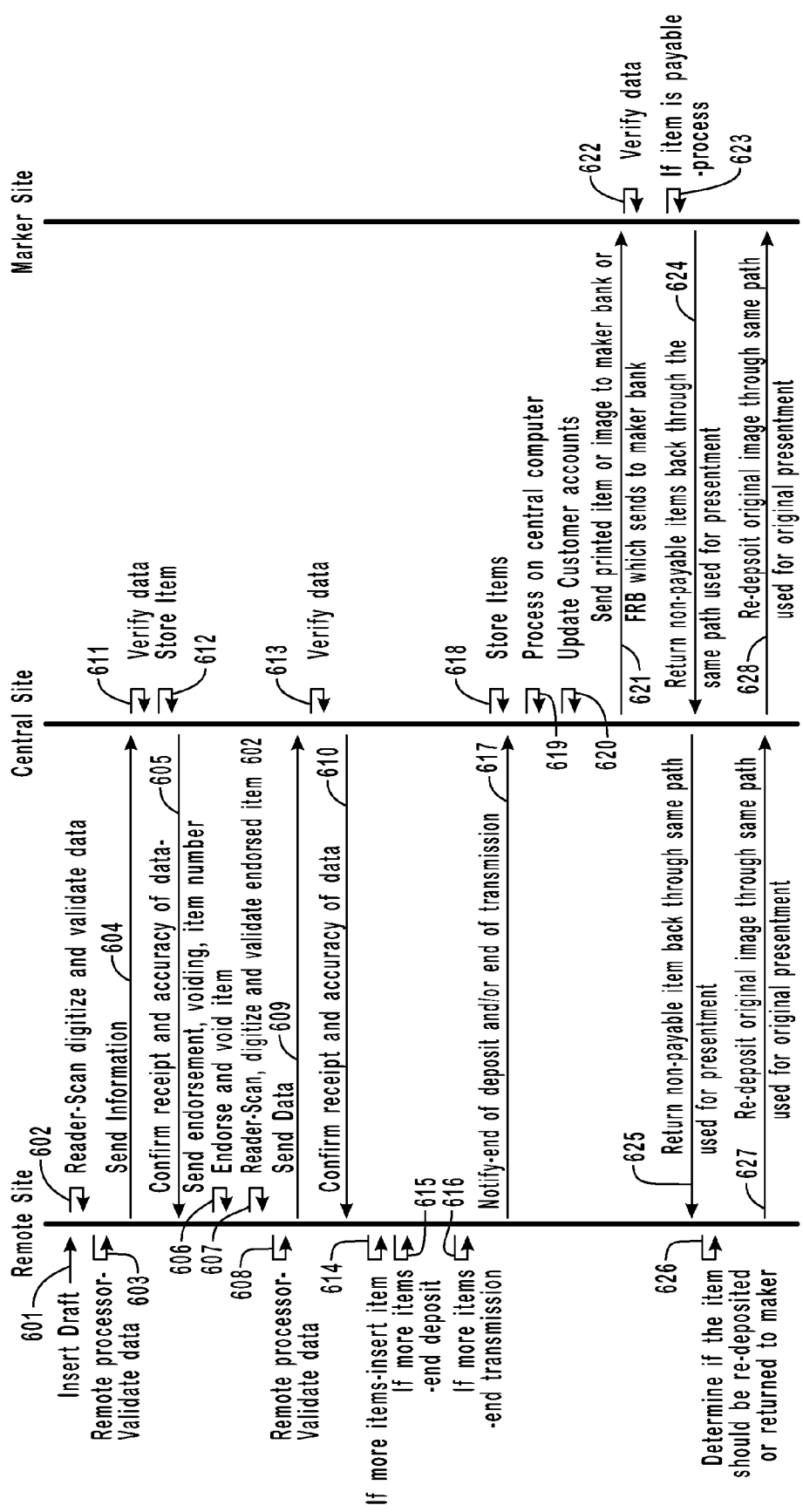
FIG. 6 illustrates a processing diagram of the interaction between entities of the present invention.
Figure 7A:
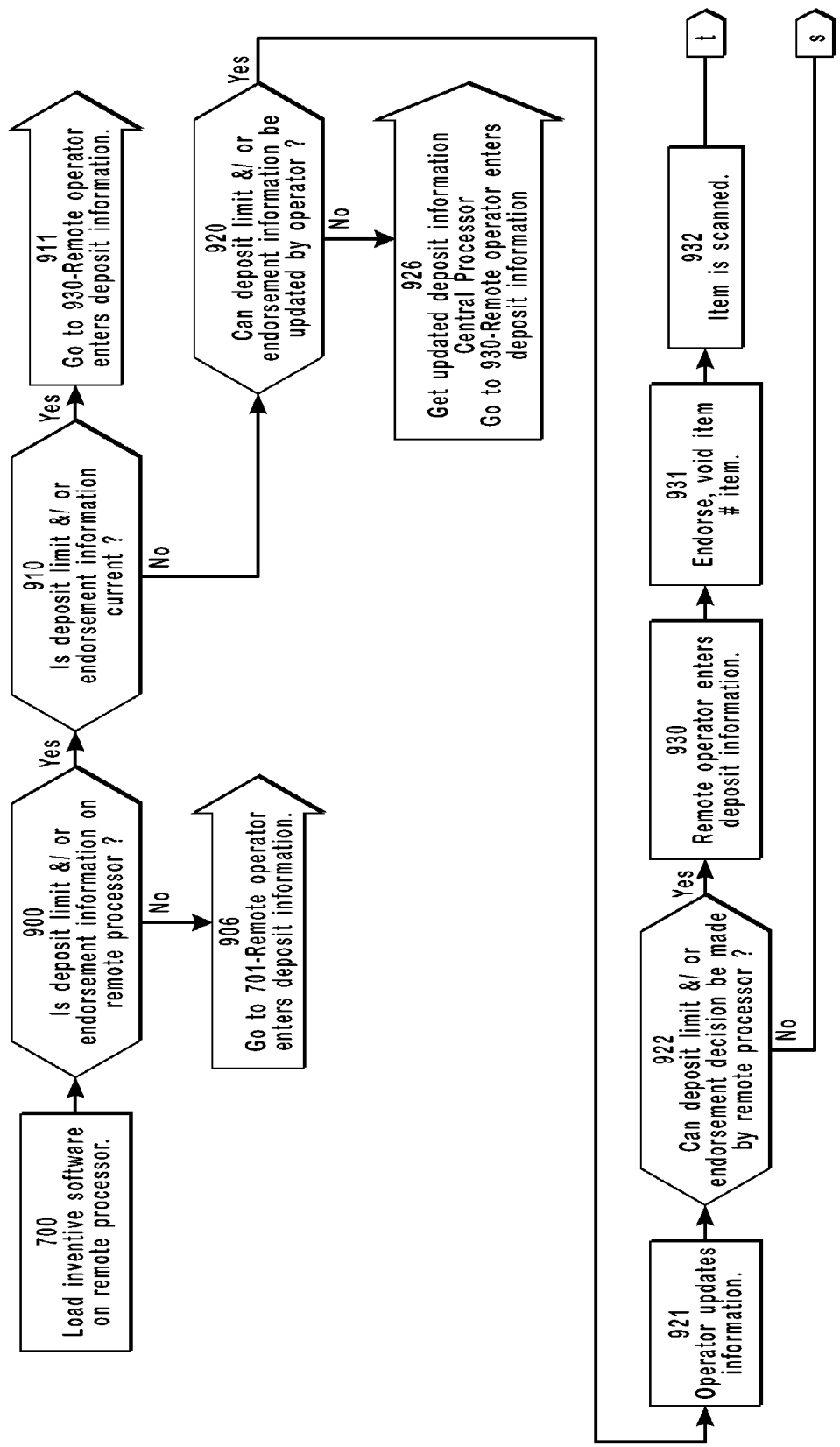
FIGS. 7*a*-7*i* are a process flowchart of check processing of the present invention.
Figure 7B:
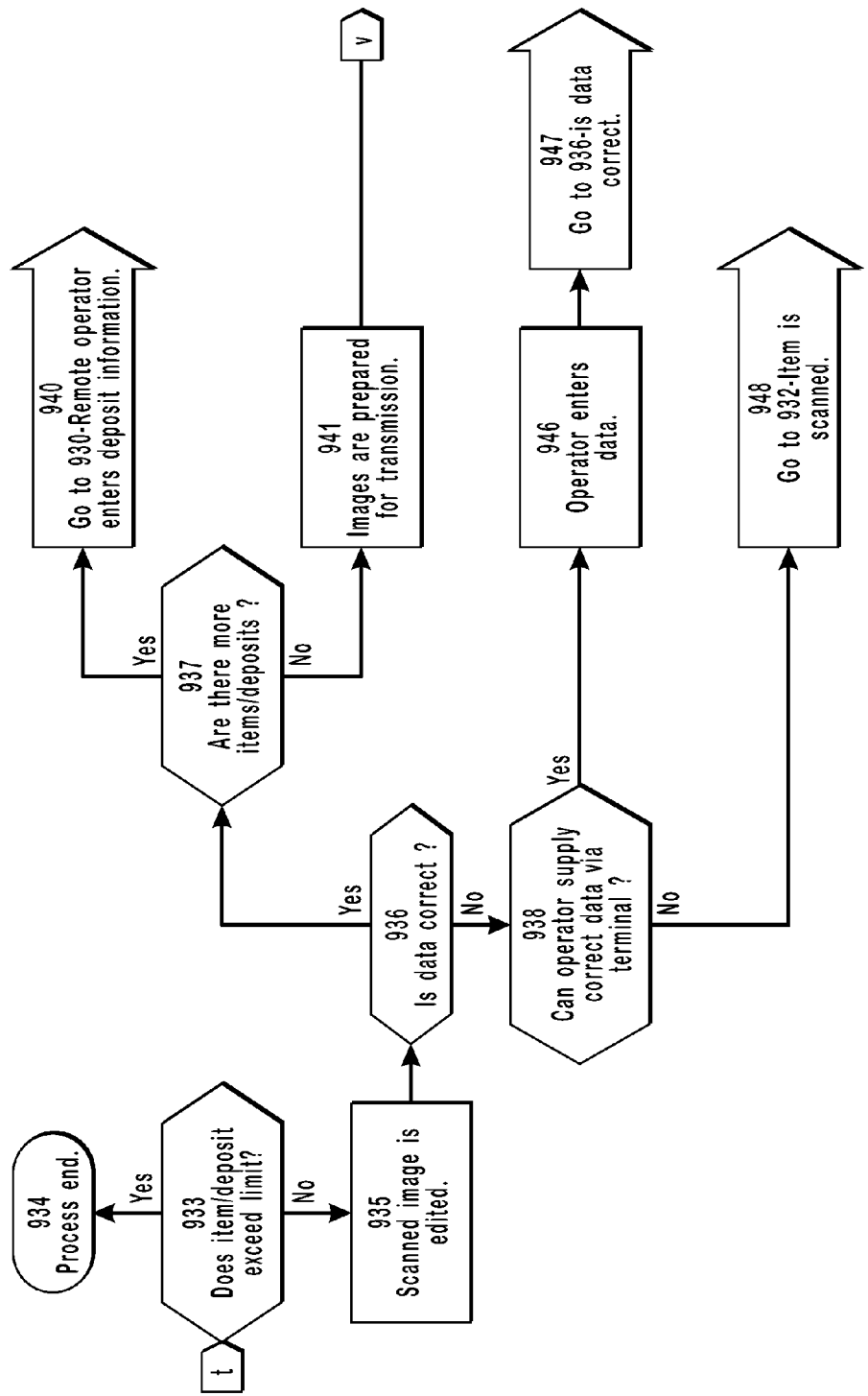
Figure 7C:
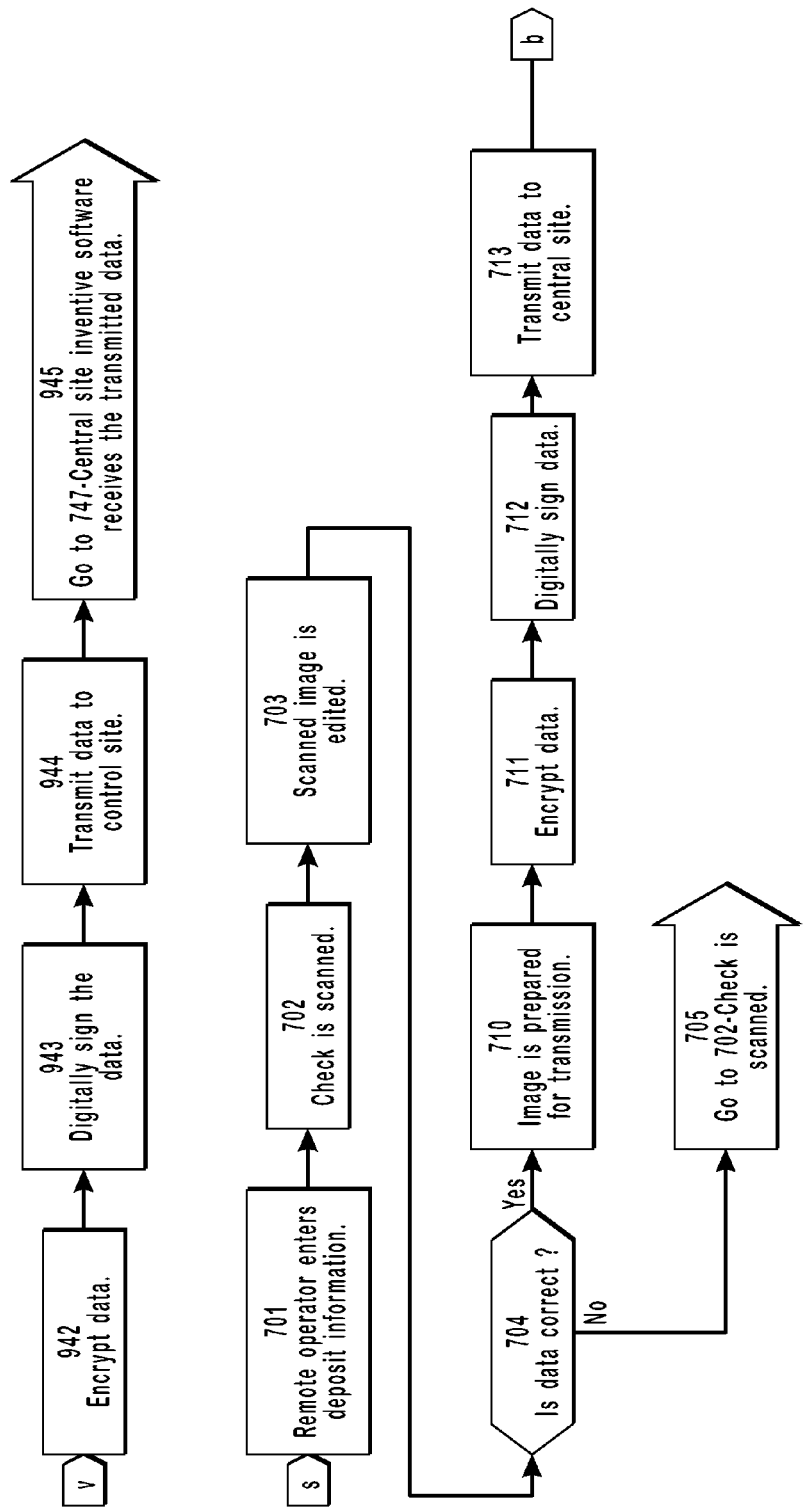
Figure 7D:
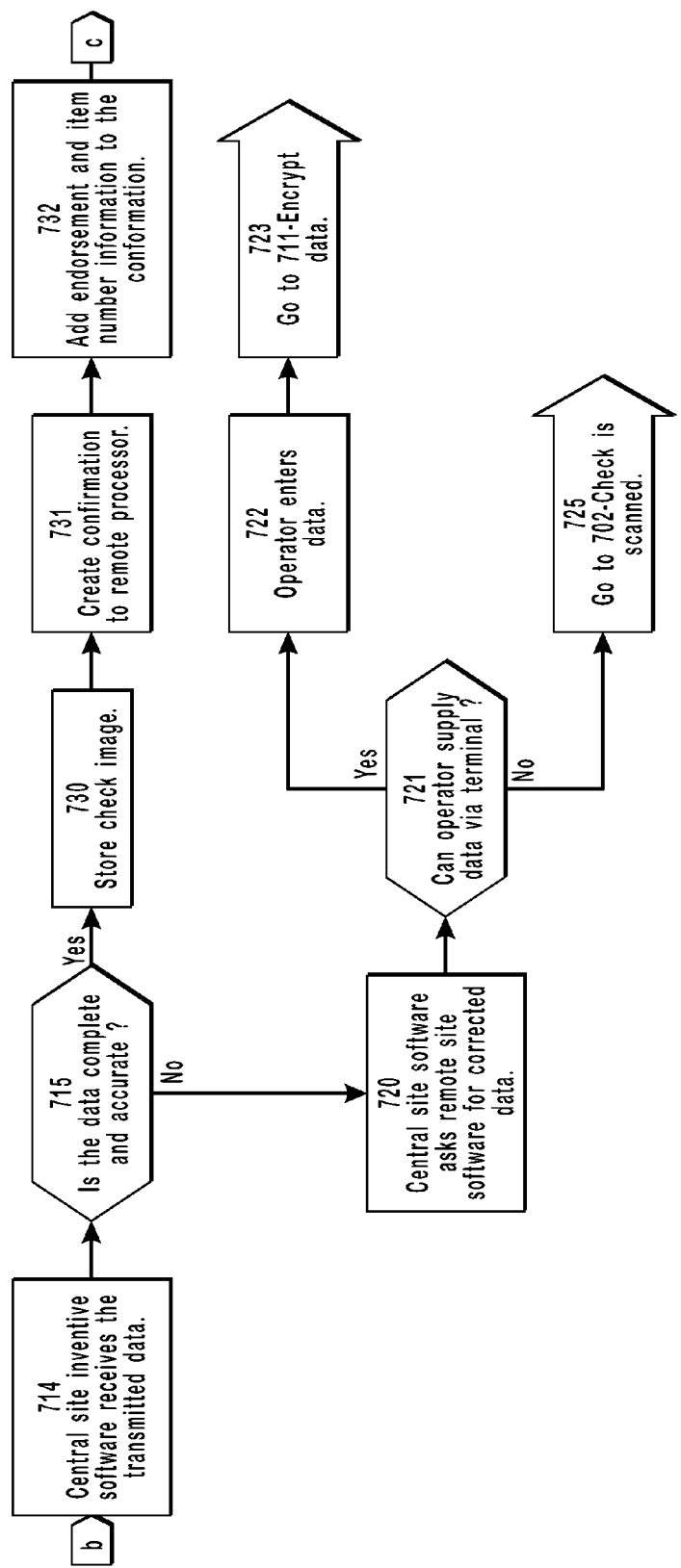
Figure 7E:
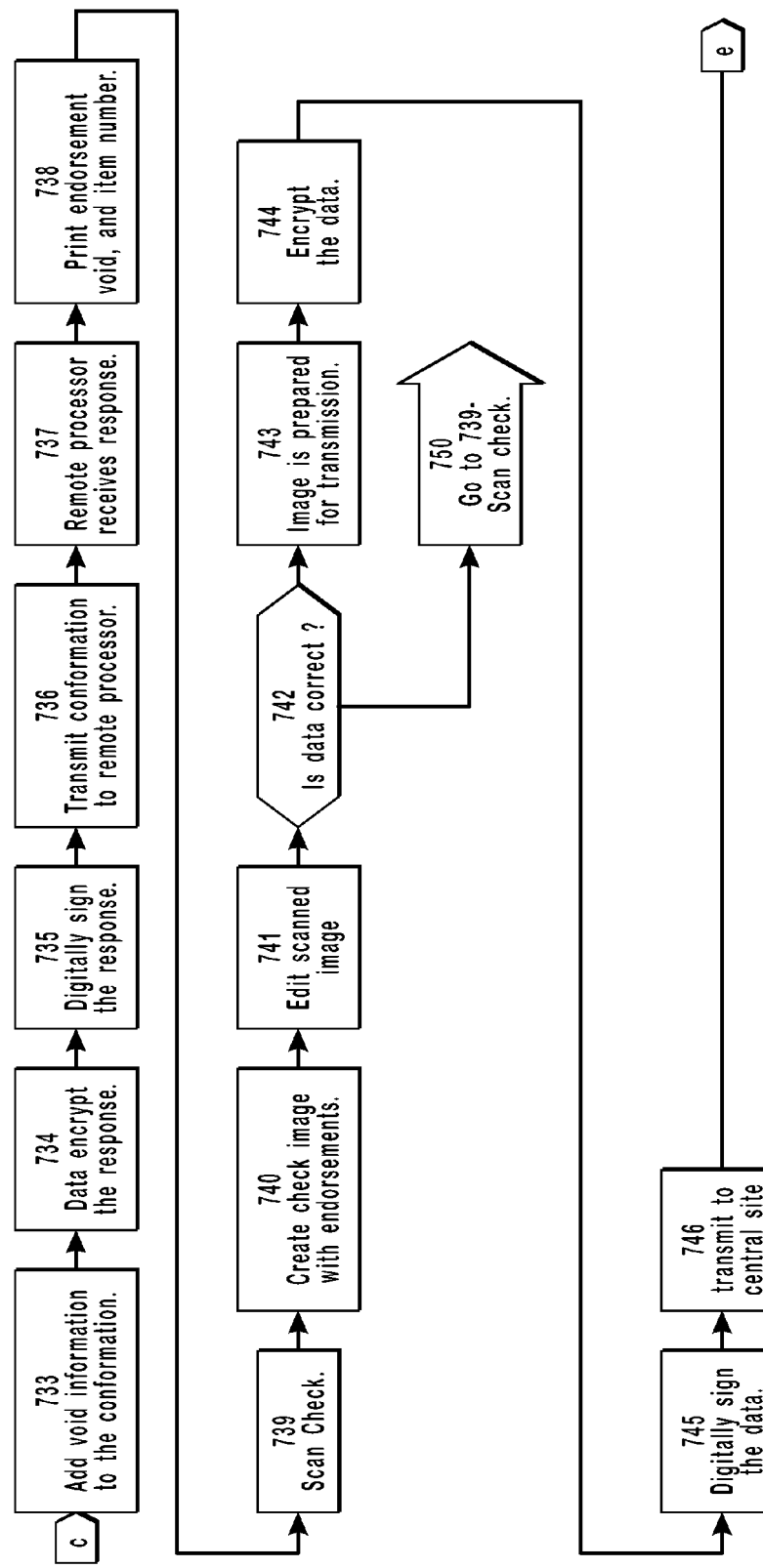
Figure 7F:
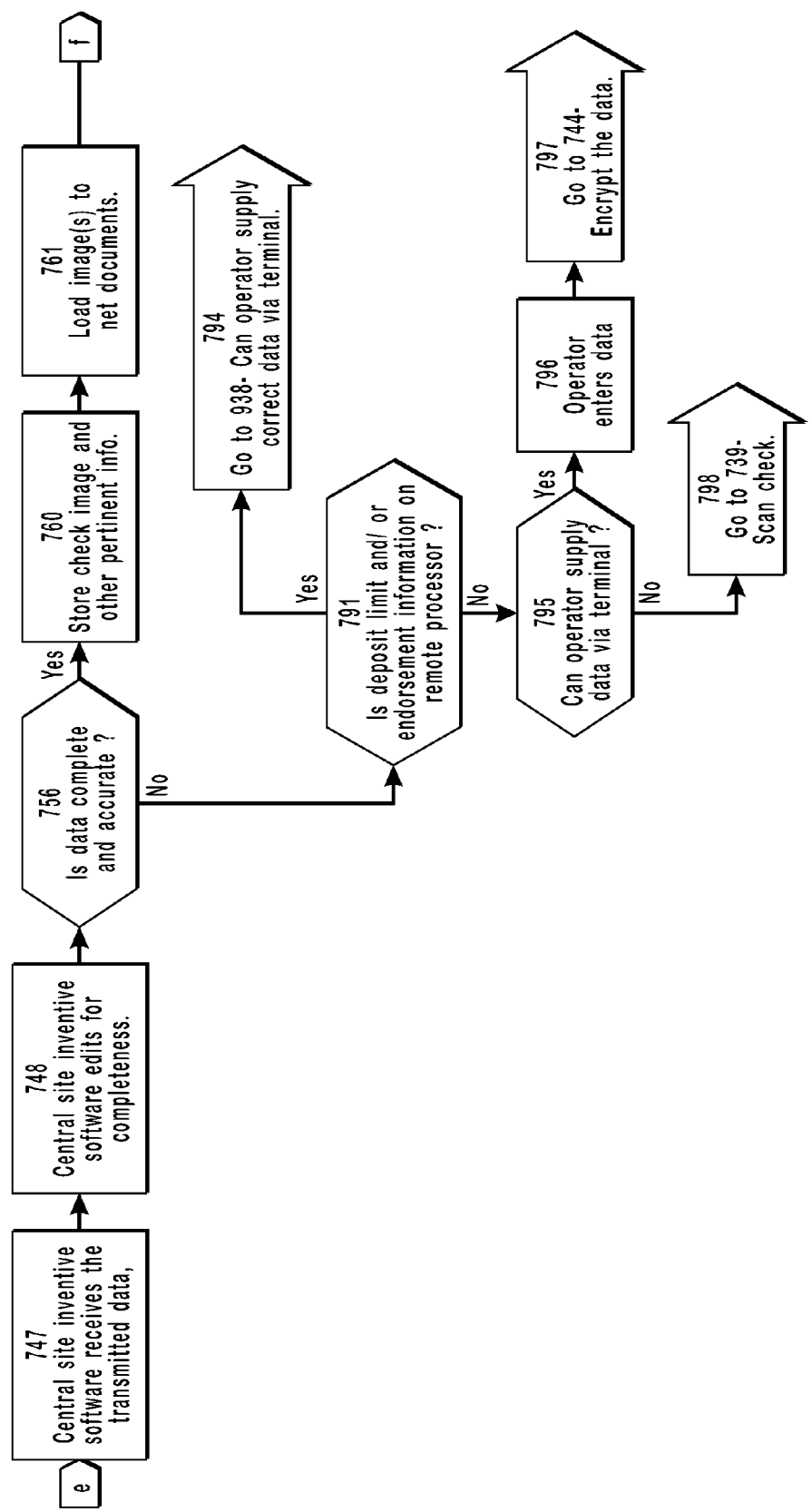
Figure 7G:
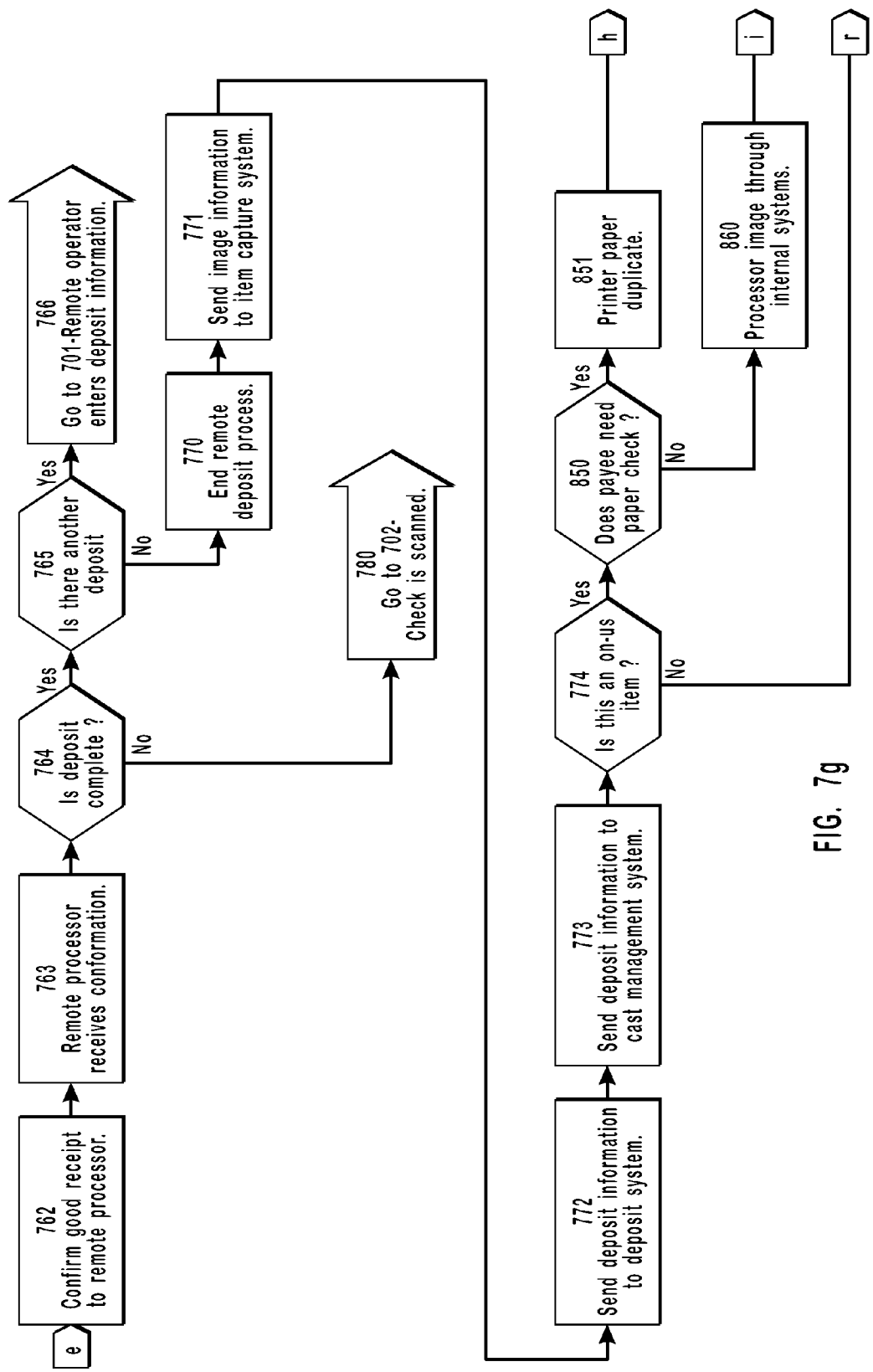
Figure 7H:
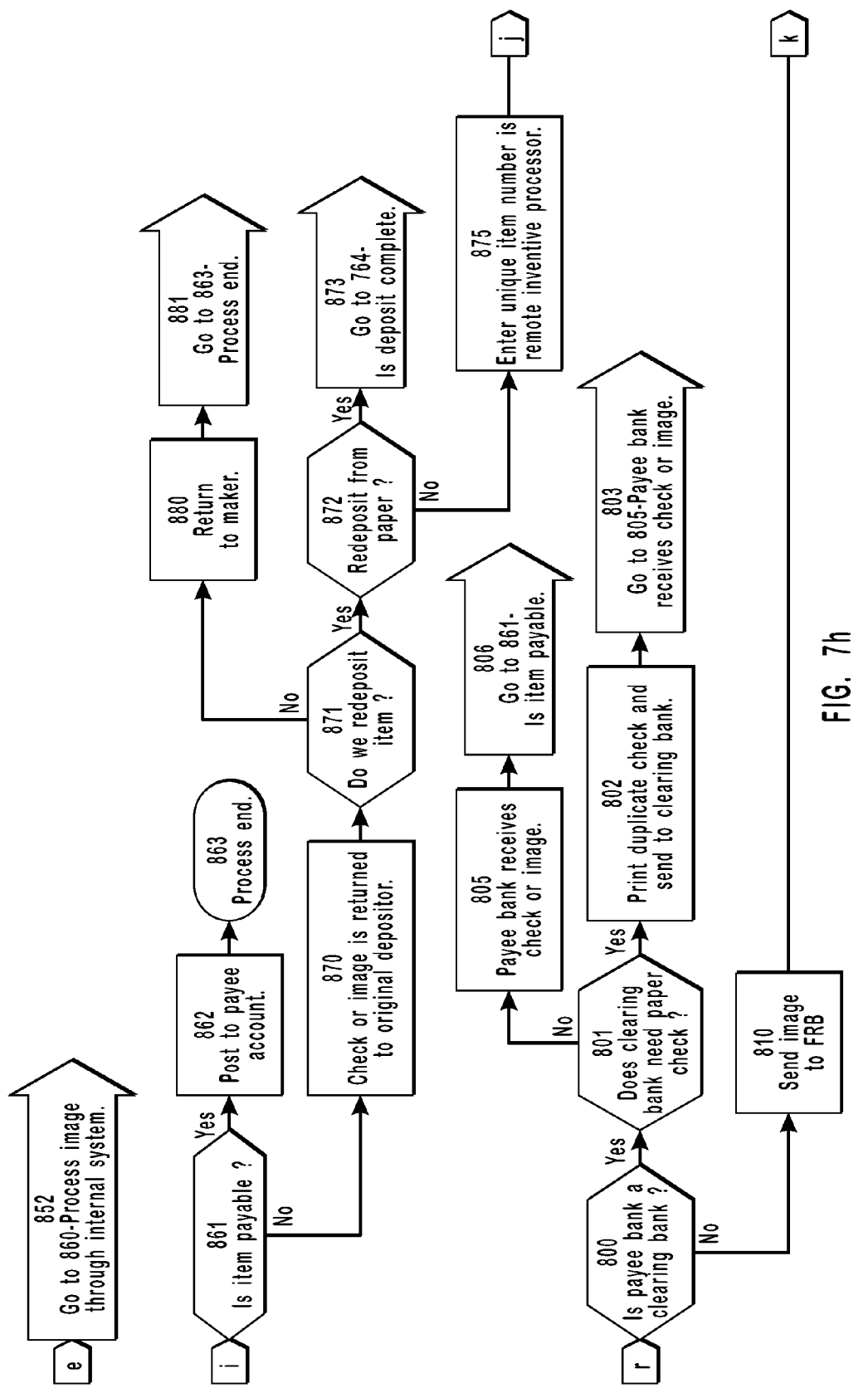
Figure 7I:
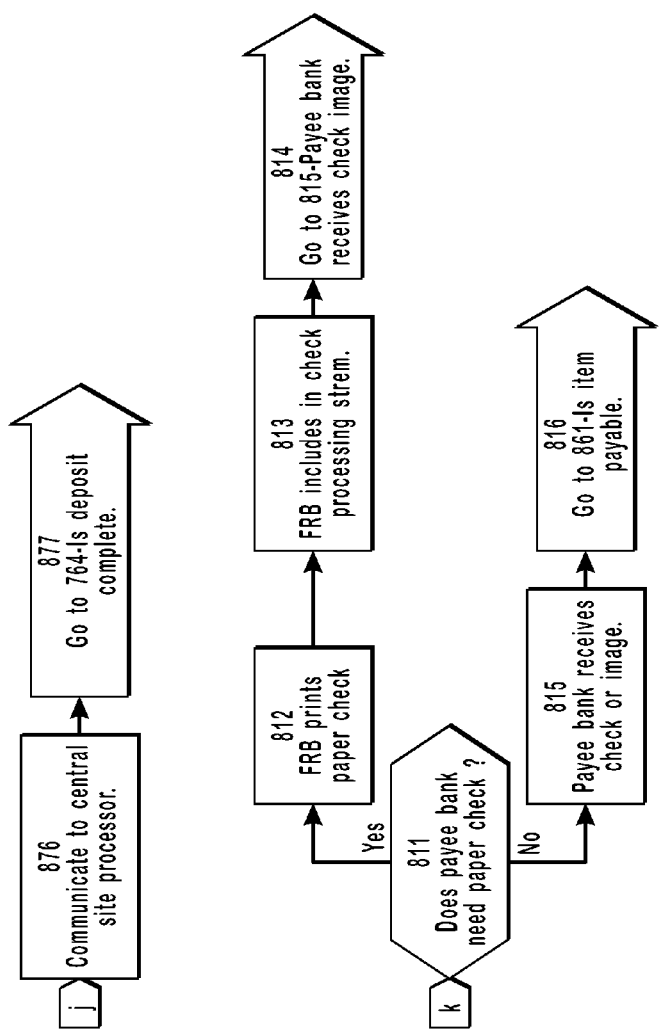

FIG. 6 is an interface diagram depicting a high level description of the interactions between the various components of the present invention, in accordance with a preferred embodiment.

In the preferred embodiment, the remote site operator enters deposit information into the remote processor then inserts a draft in a step 601 at the scanner/reader/printer located at the remote site. The scanner/reader/printer reads the item, digitizes and validates the check image information and passes it to the software on the remote site processor in a step 602. The remote site processor software receives the digitized data from the scanner/reader/printer and validates data to ensure that the check information is readable and valid in a step 603. When the image is ready for transmission to the central site. The remote site processor contacts the transmission facility and, incorporating digital signature verification and certification and data encryption software to ensure confidentiality, transmits in a step 604 the item image and control information to the central site. The central site receives the transmitted data and edits and in a step 611 verifies the check data for completeness and content.

When the central site has determined the check image and other associated data (relating to both the check image and data, and the deposit information) is complete and accurate and meets the deposit and/or item dollar limits, the central site stores the electronic image of the check and any additional associated information received from the remote site, and then confirms in a step 605 receipt of good information by sending to the remote site information needed to endorse the physical check and to void the physical item to keep it from being re-transmitted or deposited at a physical financial institution location for collection. In addition, a unique item identification number can be transmitted to the inventive software on the remote site processor for printing on the physical checks as a tracking and research mechanism. The invention allows for printing of the unique item number if it is determined by the bank employing the present invention that it is desirable to print the unique item number for tracking and research purposes.

After the inventive software on the remote processor receives specific information required to void, endorse, and print the unique item number, the remote site processor and the scanner/reader/printer will pass the check again where the remote site will print in a step 606 the information on the physical item at the locations required by the rules governing automated check processing. The item is also scanned in a step 607 again under the direction of the remote site inventive software and the new image (containing endorsement, voiding and item number information), and associated additional information required by the inventive software for tracking and control purposes, is edited in a step 608 for accuracy and completeness and if correct is then transmitted in a step 609 to the central site by the remote site using the transmission facility set up for this purposes.

If the data is not readable or correct, the information is corrected at the direction of the remote site by either re-scanning the item or having the remote site operator key the information in using the terminal attached to the remote site processor. If the item is rescanned at this point, the endorsement, voiding and item number information is not reprinted by the scanner/reader/printer. When the image is ready for transmission to the central site, the remote site processor contacts the transmission facility and, incorporating digital signature verification and certification, and data encryption software to ensure confidentiality, transmits in a step 609 the item image and control information to the central site.

The central site receives the transmitted updated image data and edits in a step 613 for completeness and content. If the data is incomplete or inaccurate, or if the image data is not readable, the central site communicates, with the remote processor and gives detailed information to the operator concerning the need for additional information to complete the inaccurate data or image information. Based on the specific need, this information can be supplied using the terminal on the remote site processor or by re-scanning the physical item and re-transmitting it to the central site. In either case, this information is supplied under the direction of the remote site processor. Such additional information is transmitted to the central site processor from the remote site processor. If the physical item is rescanned at this point, the endorsement, voiding and item number information is not reprinted by the scanner/reader/printer.

Once the central site determines the new data received for the deposit is accurate and complete, the central site stores in a step 618 the updated image of the physical item (on the database(s) maintained by the bank of first deposit's central site for this purpose) along with any additional associated information received from the remote site, and then confirms receipt in a step 610 of good information by sending a notification to the remote site that the process for that specific deposit is complete unless more items are present in a step 615 and allows for termination of the transmission of information or for the same process to be followed for other items in a step 614 in that deposit or for another deposit in a step 616.

In another embodiment of the invention, the central site stores the check image(s) on an Internet enabled documents storage system allowing access by the depositor, their designee, or the central site processing center of the bank of first deposit. The central site for storing check images and associated information preferably employees incorporating digital signature verification and certification, and data encryption to ensure confidentiality.

If the check is removed from the scanner/reader/printer prematurely, at any time during the process of capturing and transmitting data from the remote site, the transaction information associated with that check will be considered invalid and not part of the deposit. The depositor will need to re-scan and re-enter data associated with that check.

The remote site operator will have the option at the remote site to release deposit information to the central site for processing. This can be done after either a completion of single deposit in step 615 (containing one or more checks) or after completion of all deposits in step 616 (each containing one or more checks) from the remote site.

After the deposit(s) from a specific remote site are complete, the central site formats deposit information for processing in the accounting systems of the bank of first deposit's central site in a step 619, including sending the image and other appropriate information for application processing in step 620 (including deposit accounting systems, MICR capture, cash management processing, float processing, etc.).

If an item is an "on us" item, the central site determines that a physical check is required by the maker, that information is relayed to the central site and an identical image or facsimile of the original item can be printed by either the central site processor or by the item capture system in step 619.

If the maker bank is a clearing or correspondent bank then the bank of first deposit will determine if the maker bank requires a paper or image item. If the maker bank requires a paper item, then the bank of first deposit's central site will print an exact duplicate of the paper item and route in step 621 the item to the maker bank. The duplicate printed item will generally be as exact as possible based on the quality of the original image. If the maker bank does not require a paper item then the bank of first deposit will route the check image to the maker bank.

If the maker bank is not a clearing or correspondent bank, the check data including image will be forwarded in step 621 using the FRB item clearing processes to route the item image to the FRB affiliated with the maker bank. The maker bank FRB determines if the maker bank will accept check data including an image of the item. If the maker bank requires a paper item, the maker bank FRB prints an identical image of the original item with information showing that it is a duplicate and that the bank of first deposit is central site guarantees the item. This duplicated item is then sent in step 621 to the maker bank for the collections of funds.

As an alternative, the check image or a printed reproduction of the check can be sent in step 621 to the maker bank from either the bank of first deposit is central site or the maker bank FRB using any other acceptable clearing method or process.

Check items that need to be returned, are done so in steps 624 and 625 to the bank of first deposit to be routed back through the same route that was used to clear the item. If a paper item has been created, that item will be returned along with information showing the reason for return. Otherwise, the image will be used for return item purposes until the return item image is returned to the bank of first deposit's central site. At that point, if the remote site processor 201 is able to receive an item image, the image along with the return reason will be passed to the remote site processor 201. If the remote site processor is not capable of receiving check data including an item image, a paper duplicate showing the return reason will be printed either by the central site or by the item capture system under the direction of the central site and sent to the remote site operator 301. The unique item number assigned at capture time by either the central site or the remote site can a be included in all return images and/or returned paper items to enable complete and accurate tracking of all return items Re-deposit may be performed in steps 626, 627, 628 of items facilitated by the remote site prompting the remote site operator with instructions on how to scan and transmit the returned paper item or re-deposit the endorsed image previously captured and stored. The unique item number assigned at capture time by either the central site or the remote site facilitates both options.

FIG. 7 is a detailed flowchart depicting the specific steps for carrying out the invention in accordance with a preferred embodiment.

In a step 700, the software is loaded or otherwise made available to the remote site processor for execution. Those skilled in the art appreciate the various processes and steps for performing loading of software into a processor such as the remote site processor. It is also contemplated within the scope of the present invention that the software for execution on any of the processors may take the form of embedded executable instructions.

Query step 900 determines if deposit processing criteria, (e.g., deposit limit and endorsement information) are present at the remote site processor thereby enabling the initial check deposit processing decisions to be performed locally at the remote site processor or, alternatively, when the deposit processing criteria is not local on the remote site processor, processing passes through path 906 to step 701.

When query step 900 determines that deposit processing criteria is present at the remote site processor, a query step 910 determines if the information required to determine deposit limits and endorse the item is current on the remote site processor. If this information is present and current on the remote site processor, processing passes through path 911 to step 930 where the remote site operator enters deposit information, as well as the endorsement voiding and item numbering information in process step 931 prior to reading the first monetary item in process step 932 and then proceeding to query step 933. If this information is not present on the remote site processor or if it is not current, then query step 920 determines if this information can be updated by the operator. If the operator cannot update this information, then process step 926 allows for updating the deposit information from the central site processor and then proceeds to process step 930 where the operator begins the remote capture function by entering deposit information. If the operator can update this information, then process step 921 allows for the operator to update the deposit limit and endorsement information and then proceed to process query step 922.

Query step 922 determines if the remote site processor can make deposit limit and/or endorsement decisions. If the decision can be made by the remote site processor, then process step 930 allows for the remote operator to enter deposit information, as well as the endorsement voiding and item numbering information in process step 931 prior to reading the first monetary item in process step 932 and then proceeding to query step 933.

Query step 933 determines if the current item exceeds the item dollar limit or makes the deposit exceed the deposit dollar limit. If the limits are exceed then the process of entering items for the given deposit in process end 934, and the remote site operator has the option of beginning another deposit or ending the deposit process with the central site processor. If the limits are not exceeded, then process step 935 accounts for the scanned item 932 being edited for accuracy and completeness at the remote location prior to proceeding to query step 936 where it is determined if the data from the scanned item is correct.

In query step 936, if the data is correct, then query step 937 determines if there are more items to scan. If there are more items to scan, then process step 940 passes back to process step 930 to allow the remote operator to begin the item capture process over again. If query step 937 determines that there are no more items or deposits to process, then process step 941 prepares the item image data or check data for transmission prior to encrypting the data in process step 942 and digitally signing the data in process step 943. Process step 944 transmits the data image to the central site processor for editing in process step 747.

In query step 936, if the data is not correct, then query step 938 determines if the operator can correct the data using a data terminal connected to the remote site processor. If the operator can correct the data, it is done in process step 946 prior to passing through process step 947 and going back to query step 936 to test data image for correctness. In query step 938, if the scanned item image is not correct, process step 948 passes through to process 932 where the item is rescanned.

Stepping back to query step 922, if endorsement and deposit limit information cannot be made by the remote site processor, then the remote site operator enters deposit information in process step 701 before scanning the physical monetary item in process step 702 after which the item image is edited in process step 703.

In query step 704, if the image data is not correct, the check is returned to process step 702 where it is rescanned and re-edited in step 703. If query step 704 determines the image data is correct, then the data is passed successfully through process step 710 where the image is prepared for transmission to process step 711 where the date is encrypted and step 712 where the digital signature is added in preparation for transmitting the data to the central site in process step 713.

Process step 714 receives the transmitted image data and passes it to query step 715 where it is edited for accuracy and completeness. If the data is not accurate or complete, it is passed to process step 720 where the data is corrected by requesting updated information from the remote site processor. If the remote site operator cannot supply correct date via the terminal attached to the remote site processor in query step 721, then the check passes through process step 725 to process step 702 where it is scanned again in preparation for editing and transmitting the corrected image to the central site processor. If the remote site operator is able and authorized to correct the data in query step 721, the data is entered in process step 722 and passed through path 723 to process step 711 where the data is encrypted in preparation for transmitting to the central site processor.

If in query step 715 the check image data is complete and accurate, the data is passed to process step 730 where the image is stored in data sets used by the bank for document archival and research as well as in a database that is Internet enabled and available for access and research purposes by the depositing customer and bank of first deposit. After the image is stored, a confirmation of good data receipt is created in process step 731. This confirmation contains necessary endorsement, item numbering and voiding information, which is added to the confirmation record in process steps 732 and 733 prior to the confirmation being sent to the remote site processor. The confirmation record is then data encrypted in process step 734 and a digital signature is added in process step 735 prior to the record being transmitted to the remote processor in process step 736. Upon receipt by the remote processor in process step 737, the endorsement, item numbering and voiding information is printed on the physical check in process step 738 prior to it being re-scanned in process step 739.

After a new check image is created showing the necessary endorsement and voiding information in process step 740, the new check image is edited to ensure the scanned check data is correct. If in query step 742, it is determined that the image data is not complete or accurate, the image is passed through process step 750 to process step 739 where the physical check is scanned again. If the check is passed through the reader again at this point, the endorsement information has already been printed and will not be printed again. If in query step 742 it is determined that the check image data is good, the data in prepared for transmission in process step 743 prior to the data being encrypted in process step 743 and digitally signed in process step 745 prior to being transmitted to the central site in process step 746.

As the central site receives the transmitted image data in process step 747, the image is edited by the central site software in process step 748 to ensure completeness and accuracy of data. Query step 756 determines quality of data and if the data is not complete or accurate, it is sent to query step 791 where it is determined if the deposit limit and or endorsement information is available on the remote site processor. If this information is available on the remote site processor then the central site processor communicates with the remote site processor through path 794 to determine if the remote site operator can supply the correct image data in query step 938. The process involved in query step 938 was discussed above. If query step 791 determines that the deposit limit and endorsement information is not on the remote processor then query step 795 determines if the remote operator can supply the correct image information. If the operator can supply the correct image information, it is entered in process step 796 and the check image is prepared for transmission in process step 797 and passed to process step 744 (previously discussed) for digital signature and transmission. If in query step 795 the operator cannot correct/update the image information, the check is processed through path 798 to process step 739 (previously discussed) where it is scanned again in preparation for transmitting to central site processor.

Stepping back to query step 756, if the data image is complete and accurate the endorsed image of the check is stored in process step 760 in datasets used by the bank for document archival and research as well as in a database in process step 762 that is Internet enabled and available for the depositing customer and bank of first deposit to be able to access for research purposes.

The central processor site then sends confirmation of good receipt of data in process step 762 to the remote processor in process step 763. At this point query step 764 at the remote processor determines if the deposit currently being worked on is complete. If the deposit is not complete, then process step 780 returns control to the previously discussed process step 702 where the next item is scanned. If the deposit is complete query step 764 asks the operator in query step 765 if there is another deposit. If there is another deposit to be processed, process step 766 passes through to previously discussed process step 701 where the new deposit process is initiated. If there is not another deposit as determined in query step 765, the remote entry process is completed and the captured deposit and image information is entered into application processing for the bank of first deposit's central site item capture system in process step 771, the deposit systems in process step 772 and the cash management systems in process step 773.

In the course of processing a deposit, it is integral to the decision making to understand which banks the deposited items are drawn (i.e. who is the maker bank). Query step 774 determines if the monetary items in the deposit are "on us" items (i.e. items drawn on the bank of first deposit). If the items are "on us," the system determines, in query step 850, if the check maker requires a paper check. If they do, then a duplicate of the original check is printed in process step 851 and the paper item is sent to the maker of the check. In addition, the image of the item is sent to process step 860 (discussed below) for processing on internal computer accounting systems. In query step 850, if the maker of the check does not require a paper duplicate of the original item, process step 860 passes the checks image through the internal accounting systems to query step 861 where it is determined if the item is payable (i.e., does the check maker have sufficient funds in their account to cover the check, is the maker account still open, etc.).

If query step 861 determines the item is payable, the check data is posted to the maker's account and the process ends for that check item in step 863. If query step 861 determines the item is not payable, then process step 870 returns either the printed duplicate of the check or the check image to the original depositor at the remote location. In query step 871, a remote site operator determines if they want to re-deposit the item or return it. If they decide to return the item, this is done in process step 880 and path 881 sends control to previously discussed process end step 863. If query step 871 determines that the item should be re-deposited for collection, query step 872 determines if this is to be done using the duplicate paper item or the original check image.

If the return from query step 872 is to be done using the duplicate paper item, then this is done in path 873 where control is sent back to previously discussed process step 764 where the item is deposited using the scanner/reader/printer. If the check return from query step 872 is to be done using the original captured check image for the item, process step 875 allows for the remote operator to initiate this process in a step 875 by entering the unique number assigned to the original check at capture time. This information is sent to the central site processor via process step 876 and control is then passed through path 877 to process step 764 where the item is deposited using the check original check image.

Stepping back to query step 774 where it is determined if the item is an on us item, if query step 774 determines that the item in not an "on us" item then query step 800 determines if the maker bank is a clearing bank or a correspondent bank. If the maker bank is a clearing bank or a correspondent bank, then query step 801 determines if the maker bank requires a paper copy of the original check item. If they require a paper duplicate, then a paper duplicate of the original item is printed in process step 802 and sent to the maker bank in path 803 which passes control to process step 805 discussed below. If query step 801 determines that the maker bank does not require a printed duplicate check, the image of the original item drawn on the maker bank is sent to the maker bank in process step 805 and the maker bank sends the item through path 806 to previously discussed process step 861 to determine if the item is payable at the maker bank.

Stepping back to query step 800, if the payee bank is not a clearing bank or correspondent bank, process step 810 sends the check image to the Federal Reserve Bank (FRB) serving as the clearing entity for the bank of first deposit. That branch of the Federal Reserve Bank forwards the check image to the Federal Reserve Bank serving as the clearing agent for the maker bank. That Federal Reserve Bank determines in query step 811 if the maker bank requires a paper duplicate of the original paper check. If the maker bank requires a paper item, the FRB prints the paper item in process step 812, incorporates the duplicate check in their processing systems as depicted in process step 813 where the item is sent in path 814 to process step 815 where the maker bank receives the paper item. If in query step 811 the maker bank does not require a paper check, the FRB sends the image to the maker bank that receives the image in process step 815 and passes, via path 816, either the check image or printed duplicate of the original check to previously discussed query step 861 to determine if the item is payable by the maker.

The present invention may be embodied in other forms without departing from its spirit or essential characteristics. As properly understood, the preceding description of specific embodiments is illustrative only and in no way restrictive. The scope of the invention is, therefore, indicated solely by the appended claims as follows.

What is claimed is:

1. A method for bank deposit processing at a central system a plurality of checks deposited at a remote site with accompanying bank deposit information, the method comprising:
   the central system receiving bank deposit information for a plurality of different bank deposit transactions made by a plurality of different depositing individuals,
   with the bank deposit information including
      a bank deposit account designation within a bank of first deposit for each of the plurality of different depositing individuals,
      electronic check data for each of the plurality of checks being deposited by each of the plurality of different depositing individuals and
      check image data for at least one check of the plurality of checks being deposited by each of the plurality of different depositing individuals,
   wherein the central system is separate from MICR capture, deposit accounting, and float processing systems for the bank of first deposit;
   the central system transmitting at least the electronic check data for each of the plurality checks being deposited in each of the plurality of different bank deposit transactions to the bank of first deposit
   in a transmission having a transmission path that bypasses the MICR capture system of the bank of first deposit.

2. The method as defined in claim 1, wherein the central system receives the bank deposit information from at least two remote sites through which different depositing individuals made at least one bank deposit transaction.

3. The method as defined in claim 2, wherein the central system transmits the electronic check data directly to the bank of first deposit.

4. The method as defined in claim 1, wherein the central system transmits the electronic check data for each of the plurality of checks being deposited in addition to the check image data for each of the plurality checks being deposited.

5. The method as defined in claim 1, further comprising the step of the central system storing on a server accessible from the Internet at least one of the check image data, endorsed check image data and voided check image data for at least one check of the plurality of checks being deposited.

6. The method as defined in claim 1, further comprising the central system receiving information about a return check coupled with a reference key for an original deposit transaction.

7. The method as defined in claim 1, further comprising the central system receiving information about a return check coupled with a reference key for an original deposit transaction;
   the central system determining if a re-presentment of the returned check requires a duplicate hard copy of the returned check.

8. The method as defined in claim 1, wherein the transmitting step comprises:
   the central system electronically transferring at least the electronic check data or each of the plurality checks being deposited to a storage location that is electronically accessible to the bank of first deposit through remote access.

9. The method as defined in claim 1, wherein the transmitting step comprises:
the central system transmitting at least the electronic check data for each of the plurality checks being deposited in each of the plurality of different bank deposit transactions to a location accessible by the bank of first deposit using a transmission path that bypasses the MICR capture, deposit accounting, cash management, and float processing systems of the bank of first deposit.

* * * * *